(12) United States Patent
SA

(10) Patent No.: US 10,148,104 B2
(45) Date of Patent: Dec. 4, 2018

(54) DOCKING STATION AND DEVICE ADAPTER FOR USE IN A DOCKING STATION

(76) Inventor: Shuang SA, Richmond (CA)

(*) Notice: Subject to any disclaimer, the term of this patent is extended or adjusted under 35 U.S.C. 154(b) by 0 days.

(21) Appl. No.: 12/908,440

(22) Filed: Oct. 20, 2010

(65) Prior Publication Data

US 2011/0134601 A1 Jun. 9, 2011

Related U.S. Application Data

(60) Provisional application No. 61/253,318, filed on Oct. 20, 2009, provisional application No. 61/303,308, filed on Feb. 10, 2010.

(51) Int. Cl.
*G06F 1/16* (2006.01)
*H02J 7/00* (2006.01)
*H04M 1/04* (2006.01)

(52) U.S. Cl.
CPC .......... *H02J 7/0044* (2013.01); *G06F 1/1632* (2013.01); *H04M 1/04* (2013.01); *H02J 7/0027* (2013.01)

(58) Field of Classification Search
CPC ........ G06F 1/1632; H02J 7/0044; H04M 1/04
USPC ......... 361/679.41–679.45; 710/303; 439/374
See application file for complete search history.

(56) References Cited

U.S. PATENT DOCUMENTS

| | | | |
|---|---|---|---|
| 4,558,270 A | 12/1985 | Liautaud et al. | |
| 5,233,281 A | 8/1993 | Chiang et al. | |
| 5,280,229 A | 1/1994 | Faude et al. | |
| D358,579 S | 5/1995 | Richards et al. | |
| D362,227 S | 9/1995 | Richards et al. | |
| 5,659,594 A * | 8/1997 | Toda ................... | H04M 1/6075 455/550.1 |
| 5,699,226 A * | 12/1997 | Cavello .................... | 361/679.43 |
| 5,742,149 A | 4/1998 | Simpson | |
| 5,841,424 A * | 11/1998 | Kikinis ......................... | 345/168 |
| 5,899,421 A * | 5/1999 | Silverman ..................... | 248/175 |
| 6,040,681 A | 3/2000 | May | |
| D427,970 S | 7/2000 | Sage | |
| 6,115,247 A * | 9/2000 | Helot ........................ | 361/679.44 |
| 6,301,106 B1 * | 10/2001 | Helot et al. ............... | 361/679.55 |
| 6,764,788 B2 | 7/2004 | Robertson, Jr. et al. | |
| 6,972,945 B1 * | 12/2005 | Kozak ................... | G06F 1/1632 361/679.08 |

(Continued)

*Primary Examiner* — Adrian S Wilson
(74) *Attorney, Agent, or Firm* — Cozen O'Connor

(57) ABSTRACT

The embodiments disclosed herein relate generally to a docking station for charging batteries used in portable electronic devices and/or for transferring data to or from portable electronic devices. The docking station is adapted to receive a rechargeable battery either directly and/or through its portable electronic device, which can be fitted with or without a cover case. For example, the docking station has a receiving area configured to receive and hold a portable electronic device including a rechargeable battery and/or a rechargeable battery after being removed from the corresponding portable electronic device. The invention also relates to a removable device adapter for use with a docking station to receive a rechargeable battery directly and/or through its portable electronic device fitted with or without a cover case. For example, the device adapter can be removably used in a docking station during a charging operation of a rechargeable battery and/or a data transferring operation of a portable electronic device.

18 Claims, 30 Drawing Sheets

(56) References Cited

U.S. PATENT DOCUMENTS

| | | |
|---|---|---|
| 7,145,603 B2 | 12/2006 | Whitby et al. |
| 7,365,514 B2 | 4/2008 | Tong |
| D568,297 S | 5/2008 | Andre et al. |
| 7,480,138 B2 | 1/2009 | Kogan et al. |
| D602,933 S * | 10/2009 | Huang et al. .............. D14/346 |
| 7,612,997 B1 * | 11/2009 | Diebel ................ G06F 1/1632 361/679.41 |
| 7,618,065 B2 * | 11/2009 | Yau ................................ 281/29 |
| 7,639,482 B1 * | 12/2009 | Griffin ................ G06F 1/1632 361/679.1 |
| 7,643,283 B2 * | 1/2010 | Jubelirer et al. ......... 361/679.41 |
| 7,738,247 B2 * | 6/2010 | Choi ........................ 361/679.43 |
| 7,933,122 B2 * | 4/2011 | Richardson et al. .... 361/679.55 |
| 8,080,975 B2 * | 12/2011 | Bessa ................ H02J 7/0044 320/101 |
| 8,183,825 B2 * | 5/2012 | Sa ................................ 320/107 |
| 2003/0148740 A1 * | 8/2003 | Yau ........................ H04M 1/04 455/575.1 |
| 2003/0218445 A1 * | 11/2003 | Behar ................ H02J 7/0044 320/114 |
| 2004/0204056 A1 | 10/2004 | Phelps, III |
| 2005/0181756 A1 * | 8/2005 | Lin ................................ 455/344 |
| 2005/0248312 A1 * | 11/2005 | Cao ........................ H02J 7/0031 320/114 |
| 2005/0255895 A1 | 11/2005 | Lee et al. |
| 2006/0058073 A1 * | 3/2006 | Kim ....................... H04B 1/3877 455/573 |
| 2006/0181840 A1 * | 8/2006 | Cvetko ........................ 361/679 |
| 2006/0250764 A1 * | 11/2006 | Howarth et al. .............. 361/683 |
| 2007/0002533 A1 | 1/2007 | Kogan et al. |
| 2007/0047198 A1 | 3/2007 | Crooijmans et al. |
| 2007/0101039 A1 * | 5/2007 | Rutledge et al. .............. 710/303 |
| 2008/0027572 A1 * | 1/2008 | Romoser ........................ 700/94 |
| 2008/0150480 A1 | 6/2008 | Navid |
| 2008/0164845 A1 | 7/2008 | Choi |
| 2009/0009957 A1 * | 1/2009 | Crooijmans et al. ......... 361/686 |
| 2009/0114556 A1 * | 5/2009 | Tai et al. ........................ 206/320 |
| 2009/0175458 A1 * | 7/2009 | Smith ............................. 381/28 |
| 2009/0292851 A1 * | 11/2009 | Mead et al. ................... 710/303 |
| 2009/0295328 A1 * | 12/2009 | Griffin, Jr. ................... 320/115 |
| 2010/0033127 A1 * | 2/2010 | Griffin et al. ................. 320/111 |
| 2010/0081337 A1 * | 4/2010 | Dorogusker et al. ......... 439/660 |
| 2010/0087089 A1 * | 4/2010 | Struthers et al. ............. 439/533 |
| 2010/0102777 A1 * | 4/2010 | SA ................................ 320/115 |
| 2010/0158297 A1 * | 6/2010 | Stuczynski ................... 381/332 |
| 2010/0195279 A1 * | 8/2010 | Michael ................... 361/679.41 |

\* cited by examiner

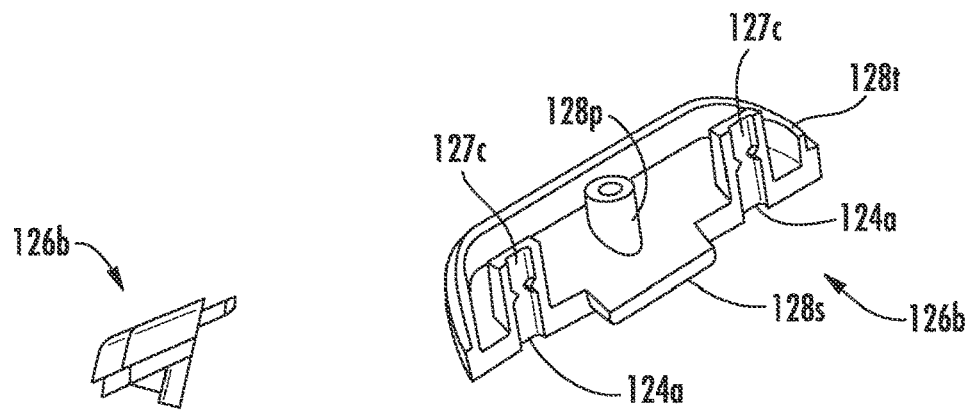
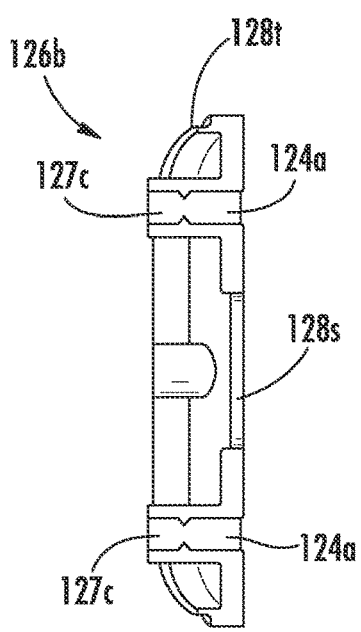
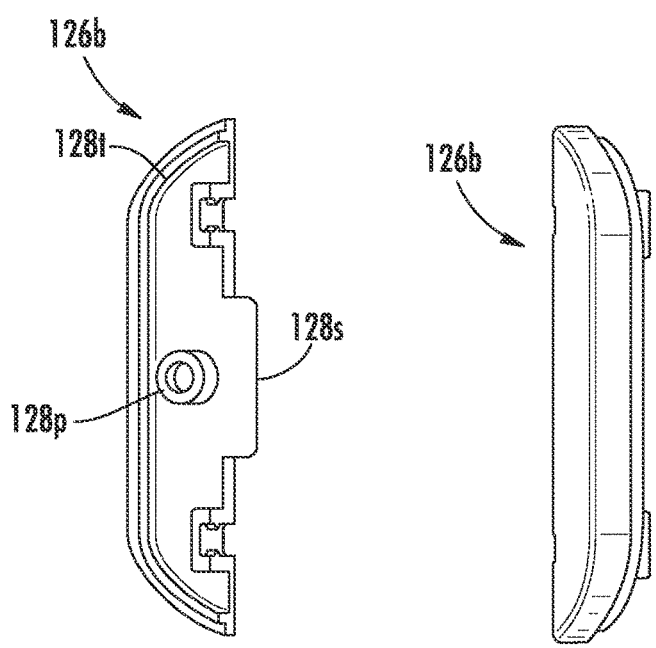
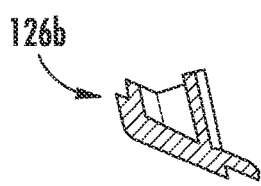
FIG. 8E
FIG. 8A
FIG. 8C
FIG. 8B
FIG. 8D
FIG. 8F

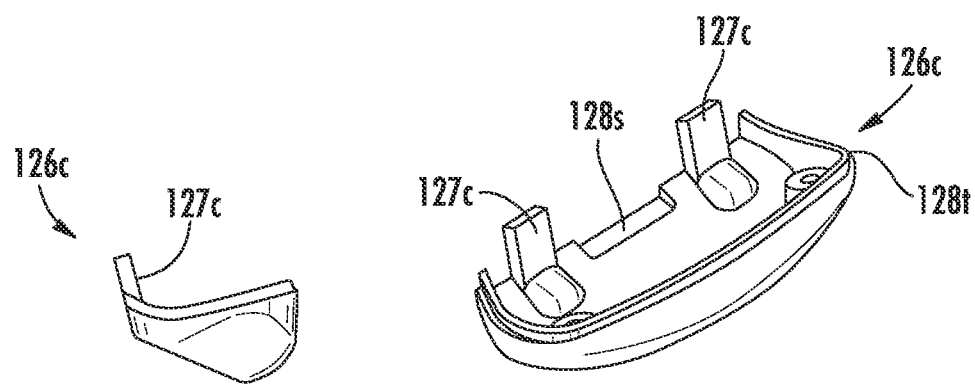
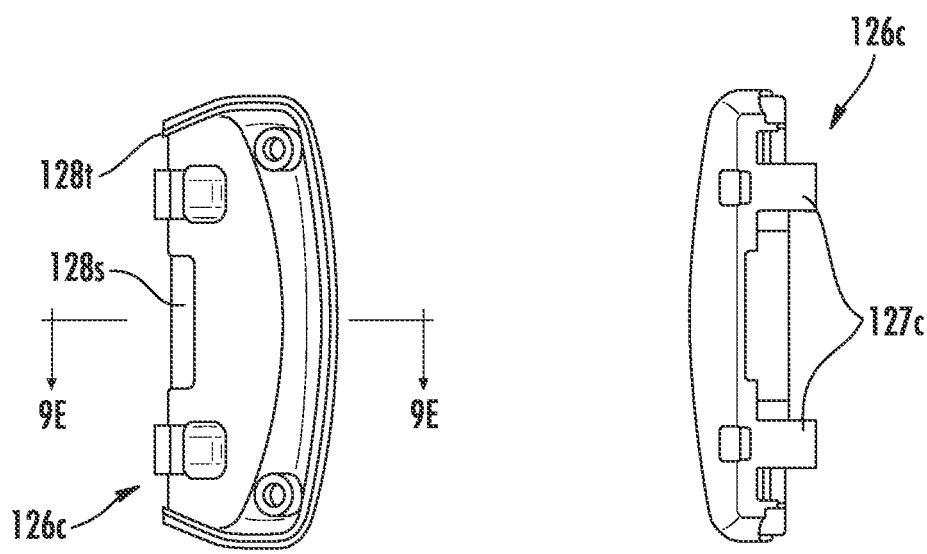
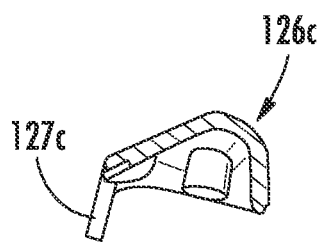

DOCKING STATION AND DEVICE ADAPTER FOR USE IN A DOCKING STATION

CROSS-REFERENCE TO RELATED APPLICATIONS

This patent application claims priority from U.S. Provisional Patent Application Nos. 61/253,318 and 61/303,308 filed Oct. 20, 2009 and Feb. 10, 2010, respectively.

BACKGROUND OF THE INVENTION

1. Field of the Invention

The invention relates generally to a docking station for charging batteries used in portable electronic devices and/or for transferring data to or from portable electronic devices. More specifically, the invention relates to a docking station adapted to receive a rechargeable battery either directly and/or through its portable electronic device fitted with or without a cover case. The invention also relates to a removable device adapter for use with a docking station to receive a rechargeable battery directly and/or through its portable electronic device fitted with or without a cover case.

2. Description of the Related Art

Various docking stations have been designed for use with portable electronic devices for charging batteries and/or transferring data. Typically, the docking station can be formed with a receiving chamber, which is adapted to have a particular shape and size to accommodate a portion of the portable electronic device so as to support the portable electronic device in the docking station. During a battery charging and/or data transfer operation of the portable electronic device, the portable electronic device is directly received in the receiving chamber of the docking station with the battery remaining in the portable electronic device.

Portable electronic devices are typically used with various removable cover cases for either protecting or decorating the portable electronic devices during normal use. When charging such a portable electronic device, a user often has to remove the cover case before placing the portable electronic device inside the docking station for charging the battery. After the charging operation is completed, the user then has to fit the cover case back onto the portable electronic device to protect and/or decorate the portable electronic device. Such additional steps of removing and refitting the cover case cause inconvenience to the user each time when the portable electronic device is to be placed in the docking station for the battery charging and/or data transfer operation of the portable electronic device.

In addition, existing docking stations are formed for use with a particular type and model of portable electronic device. When different types or models of portable electronic devices are in use, multiple different docking stations are to be provided, which can create a chaotic desktop arrangement.

The following description provides a docking station to address the above mentioned inconvenience and simplify the battery charging operation and/or data transfer operation of various portable electronic devices.

SUMMARY OF THE INVENTION

The embodiments disclosed herein relate generally to a docking station for charging batteries used in portable electronic devices and/or for transferring data to or from portable electronic devices. The docking station is adapted to receive a rechargeable battery either directly and/or through its portable electronic device, which can be fitted with or without a cover case. For example, the docking station has a receiving area, which can be configured for receiving and holding the portable electronic device. The portable electronic device to be received in the docking station can be fitted with a cover case. In the alternative, the portable electronic device can be directly received in the docking station when the portable electronic device is not fitted with any cover case. The receiving area of the docking station has a contact port to provide electrical contact for the portable electronic device during a battery charging operation and/or to transfer data to and from the portable electronic device during a data transfer operation.

The invention also relates to a removable device adapter for use with a docking station to receive a rechargeable battery directly and/or through its portable electronic device fitted with or without a cover case. For example, the device adapter can be removably used in a docking station during a charging operation of a rechargeable battery and/or a data transferring operation of a portable electronic device. The device adapter is configured to have a main adapter body to be supported by the docking station. The device adapter is also formed with at least one receiving area for receiving the rechargeable battery and/or the portable electronic device. The portable electronic device can be either fitted with or without a cover case. In addition, the device adapter is formed with at least one contact port to be electrically connected to the contact port on the docking station, thereby providing electrical contact for the rechargeable battery and/or the portable electronic device during the charging operation for the rechargeable battery and/or the data transferring operation of the portable electronic device.

The docking station can be used in two working positions. In a first working position, the device adapter is removed from the receiving area of the docking station, so that the portable electronic device is received in the receiving area in the docking station. For example, the portable electronic device can be directly received in the receiving area in the docking station free of any cover case. In such a working position, the docking station is being used in a similar manner, as is a conventional docking station. In a second working position, the docking station is used with the device adapter, while the rechargeable battery and/or the portable electronic device is received in a receiving area of the device adapter. For example, the portable electronic device fitted with a protective cover case can be received in the receiving area of the device adapter and held in position during the battery charging and/or data transfer operation of the portable electronic device.

BRIEF DESCRIPTION OF THE DRAWINGS

The following description is set forth in connection with the attached drawing figures, which are not necessarily to scale, emphasis instead generally being placed upon illustrating the principles of the invention. In the drawing figures:

FIGS. 6A to 6G are various views of a device adapter formed according to a second embodiment, wherein FIGS. 6A and 6B are perspective views of the device adapter, FIGS. 6C to 6G are respectively top, bottom, front, rear, side views of the device adapter shown in FIGS. 6A and 6B;

FIGS. 7A to 7F are various views of a first part of the device adapter shown in FIGS. 6A to 6G, wherein FIG. 7A is a perspective view of the first part of the device adapter and FIGS. 7B to 7F are respectively top, bottom, front, side, and cross-section views of the first part;

FIGS. 8A to 8F are various views of a second part of the device adapter shown in FIGS. 6A to 6G, wherein FIG. 8A is a perspective view of the second part of the device adapter and FIGS. 8B to 8F are respectively top, front, rear, side, and cross-section views of the second part;

FIGS. 9A to 9E are various views of a third part of the device adapter shown in FIGS. 6A to 6G, wherein FIG. 9A is a perspective view of the third part of the device adapter and FIGS. 9B to 9E are respectively top, side, front, and cross-section views of the first part;

DETAILED DESCRIPTION OF THE EMBODIMENTS

Figure 1:
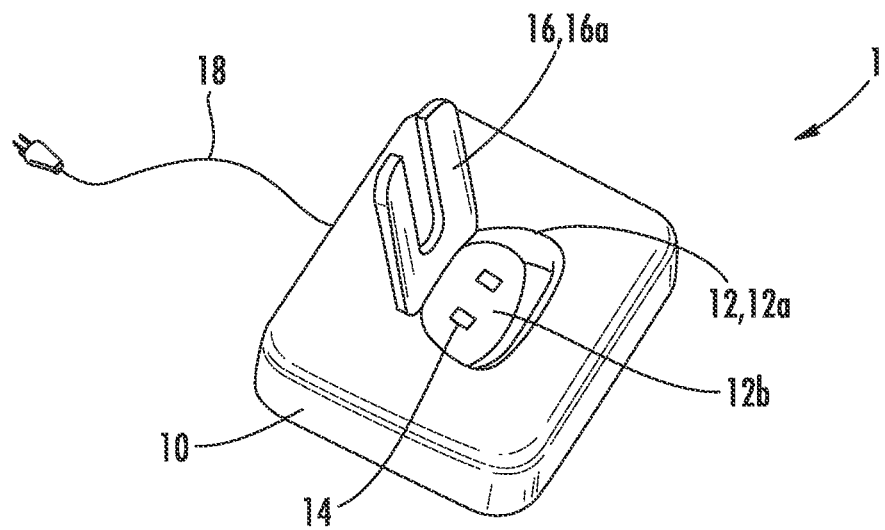
FIG. 1 is a perspective view of a docking base in a docking station.

Various embodiments of the docking station 1 and the device adapter 20 are described below in connection with the drawing figures. In the following description of different embodiments, similar components are designated with numeral references with the same lower digits and redundant description is omitted.

The various docking stations 1 described herein are provided to charge various rechargeable batteries 2' used in portable electronic devices 2. The battery charging operation can be carried out either directly to the rechargeable battery 2' after it is removed from the corresponding portable electronic device 2 or through the portable electronic device 2 when the rechargeable battery 2' remains inside the portable electronic device 2. Additionally or alternatively, the docking stations 1 described herein are provided to transfer data to or from the various portable electronic devices 2. Although the docking stations 1 in the various drawing figures are shown in a desktop form, the docking stations 1 described herein are not so limited and can be formed to be mounted on a wall, used in a vehicle, or built-in a dashboard or an electronic device. Additionally or alternatively, although mobile phones are shown in the various drawing figures as examples of the portable electronic devices 2, the various embodiments are not limited to use with such mobile phones. The docking stations 1 described herein can be configured to use with any of various rechargeable batteries 2' and/or portable electronic devices 2, including but not limited to cell phones with or without operating systems, personal data assistants (PDA), mobile computers, portable video games, MP3 players, digital cameras, video cameras, voice recorders, global positioning systems (GPS), scanners, or other portable electronic devices that use rechargeable batteries.

FIG. 1 shows a docking base 10 in a docking station 1 configured for use with any of various rechargeable batteries 2' and/or portable electronic devices 2 during a battery charging and/or data transfer operation. In one example, the docking base 10 can be formed similarly to a conventional charger. In the example of FIG. 1, the docking base 10 can have a receiving area 12 formed with a contact port 14 for supplying electrical power during the battery charging operation and/or for transferring data to and from a portable electronic device 2. The docking base 10 can directly receive and hold the portable electronic device 2 without a cover case in a first working position of a battery charging and/or data transfer operation, similarly to a conventional docking station.

Figure 2:
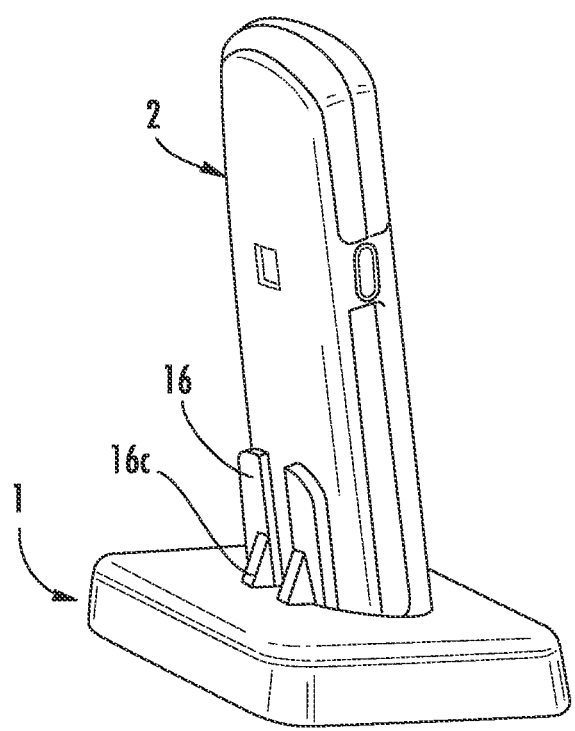
FIG. 2 shows a first working position of the docking station holding a portable electronic device in the receiving area in the docking base shown in FIG. 1.

As is shown in FIGS. 1 and 2, the receiving area 12 of the docking base 10 can be configured in any of various ways to receive and hold a portion of the portable electronic device 2. Although the portable electronic device 2 is shown in FIG. 2 to be directly received in the receiving area 12 of the docking base 10 and free of a cover case 4, the receiving area 12 of the docking base 10 can be configured to receive a portable electronic device 2 fitted with a cover case 4. Additionally or alternatively, the receiving area 12 of the docking base 10 can be configured to receive a rechargeable battery 2' directly after it is removed from the portable electronic device 2. In one example, the receiving area 12 can accommodate a portion of the portable electronic device 2 including a device port (not shown) and allow the device port to interact with the contact port 14 in the receiving area 12. In one example, the receiving area 12 of the docking base 10 can be formed as a receiving chamber 12a having sufficient volume to accommodate a charging portion of the portable electronic device 2 including the device port. In the example shown in FIG. 2, the receiving chamber 12a in the docking base 10 can be formed to receive the bottom portion of the portable electronic device 2. As one skilled in the art will appreciate, the docking base 10 and the docking station 1 can be formed in various other forms to receive the port portions of various other portable electronic devices 2.

Additionally or alternatively, the receiving area 12 in the docking base 10 can be formed in various ways to provide at least partial support to the portable electronic device 2 and held the portable electronic device 2 in place after it is placed in the receiving area 12. For example, the receiving area 12 can be configured to be at least partially in contact with a body portion of the portable electronic device 2 to provide support thereto during the battery charging and/or data transfer operation. In one example, the receiving area 12 is formed to be in contact with the portable electronic device 2 at one or more locations to thereby support and hold the portable electronic device 2 in position during the battery charging and/or data transfer operation. In another example, at least part of the receiving area 12 can have a shape and/or size complement to a body portion of the portable electronic device 2. In a further example, the receiving area 12 can be shaped to snuggly fit around a port portion of the portable electronic device 2 including the device port so as to hold the portable electronic device 2 in place during the battery charging and/or data transfer operation.

One or more additional supports 16 can be provided on the docking base 10 to support and hold the portable electronic device 2 in position during the battery charging and/or data transfer operation. In the example shown in FIG. 1, an additional support 16 is provided to support the portable electronic device 2 in an inclined position during the battery charging and/or data transfer operation, as is shown in FIG. 2. The additional support 16 can be either integrally formed with the docking base 10 or separately formed and later assembled in the receiving chamber 12a. In the example shown in FIG. 1, the additional support 16 contains two prongs 16a extending upwardly from the docking base 10. In another example shown in FIG. 2, the receiving chamber 12a acts as a stop and prevents the bottom portion of the portable electronic device 2 from slipping away from the receiving area 12. As one skilled in the art will appreciate, the receiving area 12, the receiving chamber 12a, and/or the additional support 16 can be formed in various other forms, such as those described in the various embodiments below, to support and hold the portable electronic device 2 in position during the battery charging and/or data transfer operation.

The contact port 14 of the docking base 10 can have any of various forms for connecting to a device port formed in the portable electronic device 2. For example, a standard USB type terminal can be formed on the docking base 10 to mate with a standard USB type device port formed on mobile phones. In the example shown in FIG. 1, the contact port 14 is formed in the bottom 12b of the receiving chamber 12a. As one skilled in the art will appreciate, the contact port 14 of the docking station 1 can be formed at any of various locations inside the receiving chamber 12a of the docking base 10, depending on the position of the device port on the portable electronic device 2 to be maintained.

The docking station 1 can be formed with additional electrical connectors and circuits in the docking base 10 for connecting the contact port 14 to external sources to supply electrical power and/or transfer data to the portable electronic device 2 during the battery charging and/or data transfer operation. For example, the docking station 1 can include a connector 18, such as a power cord, for connecting to any of various external power sources (not shown), such as a standard AC outlet, an automobile 12V supply, or a low voltage 5V supply. Suitable electrical circuits can be formed in the docking base 10 to convert a standard AC power supply to a voltage supply compatible to the portable electronic device 2. In one example, the connector 18 can have a USB terminal for connecting to a USB port formed in a power adapter device. Additionally or alternatively, the connector 18 can connect the docking base 10 to a compatible port on a computer device for data transfer and power supply. In one example, a USB cable can be used for one of or both the battery charging and data transfer operations. As one skilled in the art will appreciate, various ports, electrical charging circuits, and/or electrical connectors can be employed for the above described purposes.

Optionally, the docking base 10 can be formed with additional components associated with a battery charging and/or data transfer operation. For example, one or more switch can be provided on the docking base 10 for manual control of a battery charging and/or data transfer process. In addition, the docking base 10 can contain various indicators to notify the user of the status of the battery charging and/or data transfer process.

FIG. 2 shows a first working position of the docking station 1. In such first working position, the docking station 1 directly receives and holds a portable electronic device 2 during the battery charging and/or data transfer operation. In one example, the portable electronic device 2 is directly received in the receiving chamber 12a in the docking base 10 and free of a cover case. The contact port 14 in the docking base 10 electronically connects to the device port in the portable electronic device 2 for supplying power to and/or for transferring data to and from the portable electronic device 2. As is discussed above, the docking base 10 and/or the docking station 1 can be configured to receive the portable electronic device 2 fitted with a cover case 4 and/or to receive a rechargeable battery 2' directly after it is removed form the portable electronic device 2.

Figure 3A:
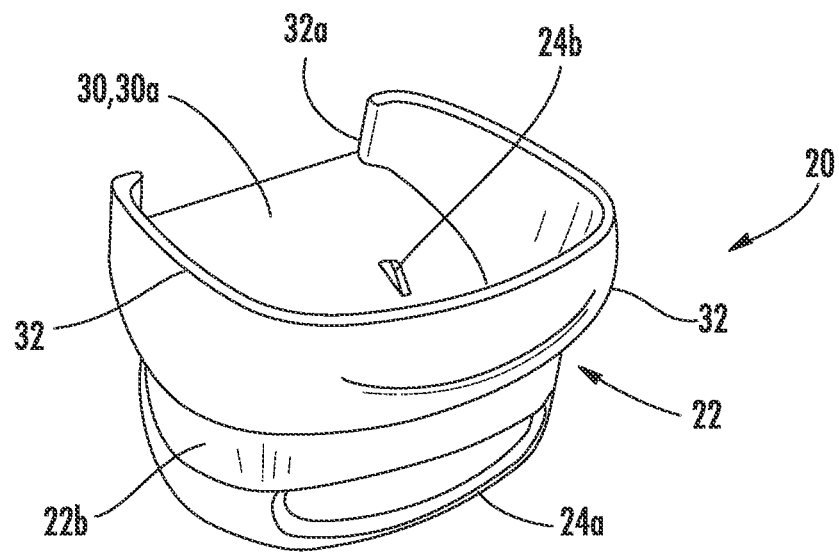
FIGS. 3A and 3B are perspective views of a device adapter formed according to a first embodiment.
Figure 3B:
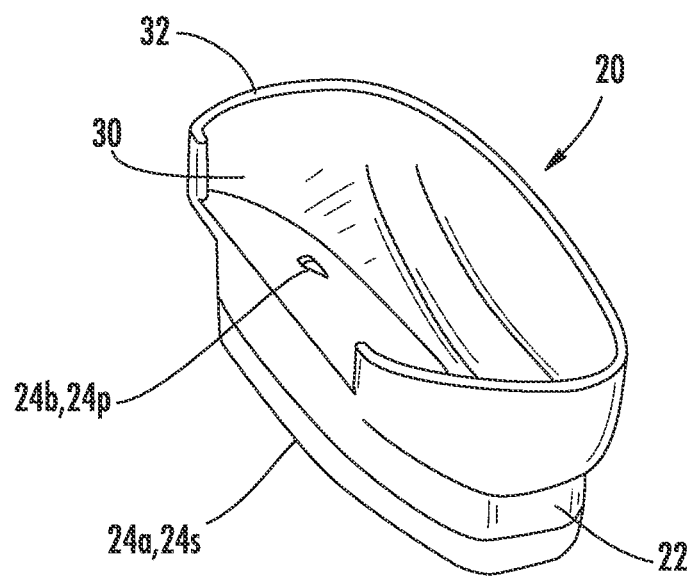
Figure 4:
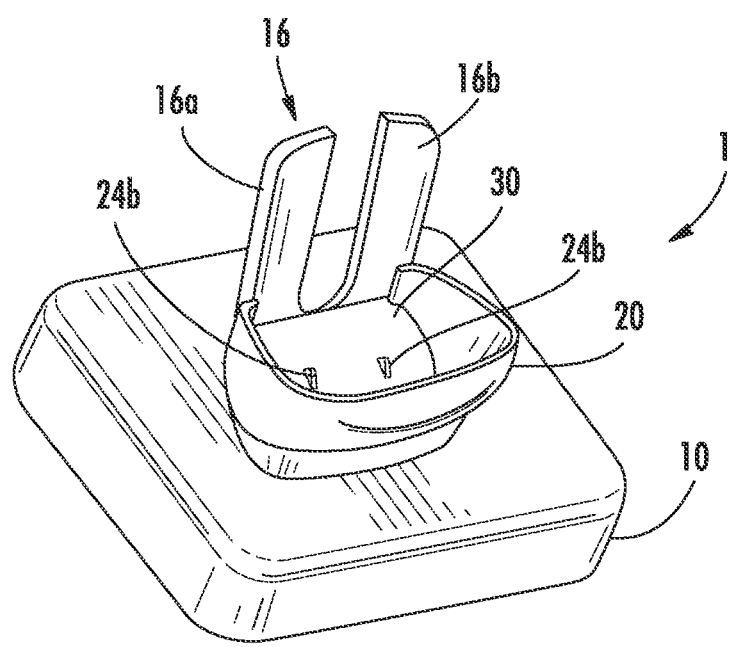
FIG. 4 is perspective view of the FIG. 1 docking station assembled with the device adapter shown in FIGS. 3A and 3B.

FIGS. 3A and 3B show a device adapter 20 formed according to a first embodiment. The device adapter 20 can be removably used with the docking base 10 in the battery changing and/or data transferring operation. The device adapter 20 has a main adapter body 22 configured to be supported by the docking base 10. The main adapter body 22 can include a base portion 22b adapted to be supported in the receiving area 12 of the docking base 10, as is shown in FIG. 4. For example, the base portion 22b is fitted and held in the receiving chamber 12a of the docking base 10.

Additionally or alternatively, the base portion 22b of the device adapter 20 can be formed to have a shape and/or size that prevents the base portion 22b from lateral movement inside the receiving chamber 12a. In one example, the base portion 22b can be formed to have a substantially same but complementary shape of at least part of the receiving area 12 and be immovably held therein until the device adapter 20 is removed from the receiving area 12 by a user. In such a case, the base portion 22b can be adequately supported by the device adapter 20 in the docking base 10 without further support. The device adapter 20 and the docking base 10 can thus form an integrated assembly. As one skilled in the art will appreciate, the main adapter body 22 and the base portion 22*b* can be formed in various other forms, as described below, to support the device adapter 20 in place during the battery charging and/or data transfer operation.

The device adapter 20 can also include first and second contact ports 24*a*, 24*b*. The first contact port 24*a* is formed on the base portion 22*b* for electrically connecting with the contact port 14 on the docking base 10, while the second contact port 24*b* can be formed on the main adapter body 22 for electrically connecting with the contact port of the portable electronic device 2. The first and second contact ports 24*a*, 24*b* can be of the same type or otherwise compatible with the respective contact ports on the docking base 10 and the portable electronic device 2.

For example, when the contact port 14 on the docking base 10 is in the form of connecting pins, the first contact port 24*a* can be formed as compatible connecting sockets 24*s* while the second contact port 24*b* can be formed to include compatible connecting pins 24*p*. In one example, the connecting pins 24*p* of the second contact portion 24*b* can be formed with sufficient length to pass through the cover case 4 and reach the contact port in the portable electronic device 2. In another example, the second contact port 24*b* can be formed to have a contact support for supporting the contact port on the portable electronic device 2 as will be described in further embodiment below. As will be described in the various embodiments below, the first and second contact ports 24*a*, 24*b* of the device adapter 20 can be made in various other forms, such as a USB type port.

Additionally or alternatively, the first and second contact ports 24*a*, 24*b* of the adapter device 20 can be electrically connected to each other in various manners, so as to electrically connect the portable electronic device 2 to the docking base 10 during the battery charging and/or data transferring operation. In a pin type contact port, such as the above described example, each of the connecting sockets 24*s* in the first contact port 24*a* can be electrically connected to a corresponding connecting pin 24*p* of the second contact port 24*b*. The connecting pins 24*p* of the second contact port 24*b* are separated and insulated from each other. Additionally or alternatively, the first and second contact ports 24*a*, 24*b* can be electrically connected with each other through additional electrical circuit as will be described below.

Figure 5A:
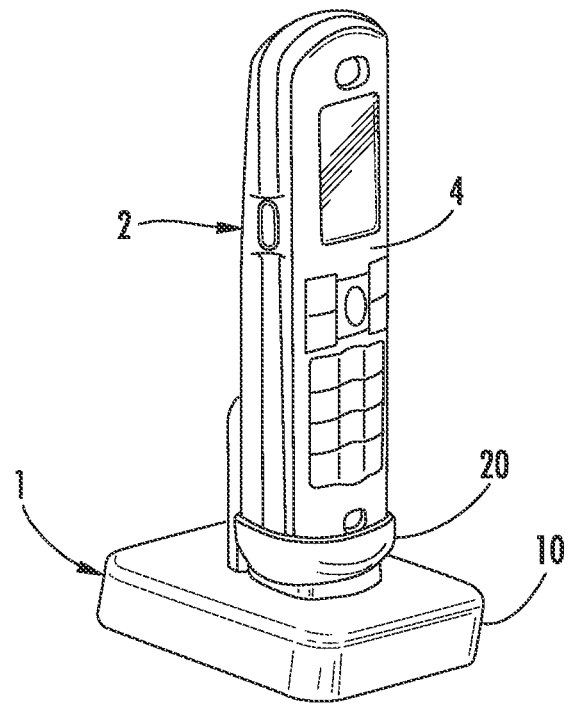
FIGS. 5A and 5B are front and rear perspective views of the FIG. 4 docking station in a second working position, where the assembled device adapter and docking station shown in FIG. 4 receive the portable electronic device in a receiving area of the device adapter.
Figure 5B:
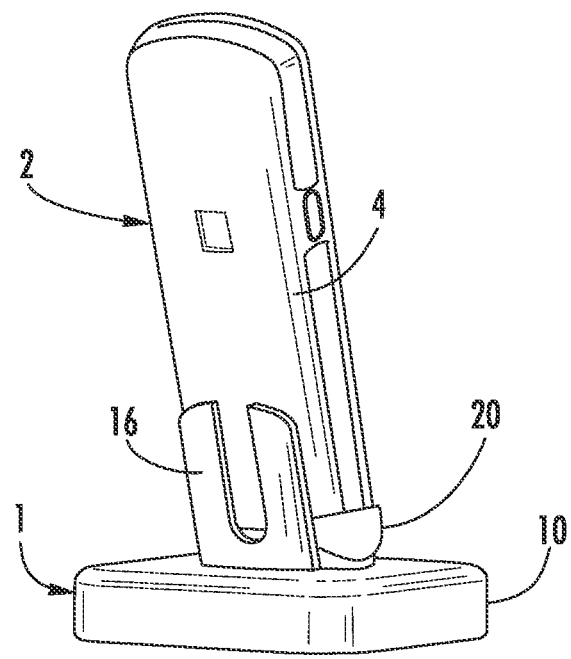

In the example shown in FIGS. 3A and 3B, the device adapter 20 can further include a receiving area 30 configured to receive and support the portable electronic device 2. In one example, the receiving area 30 of the device adapter 20 is configured to receive and support the portable electronic device 2 fitted with a cover case 4. For example, the receiving area 30 can support a port portion of the portable electronic device 2 fitted with a cover case 4 in a second working position, as is shown in FIGS. 5A and 5B. In one example, the receiving area 30 on the device adapter 20 can be formed as a receiving chamber 30*a* having sufficient volume to accommodate a port portion of the portable electronic device 2 fitted with a cover case 4. In such a case, the user can charge the portable electronic device 2 without removing its cover case 4, thereby simplifying the battery charging and/or data transfer operation.

Additionally or alternatively, the receiving area 30 on the device adapter 20 can be formed to support and hold the combined portable electronic device 2 and cover case 4 in place during the battery charging and/or data transferring operation. In one example, the receiving chamber 30*a* can be formed to be partly in contact with the cover case 4 fitted on the portable electronic device 2, when the combined portable electronic device 2 and cover case 4 is placed in the receiving chamber 30*a* in the device adapter 20. For example, part of the receiving chamber 30*a* is formed to partially contact and support the lower front portion of the combined portable electronic device 2 and cover case 4 during the battery charging and/or data transfer operation. In one example best illustrated in FIG. 5A, the front wall of the receiving chamber 30*a* can be positioned to contact the lower front portion of the combined portable electronic device 2 and cover case 4. Such front wall of the receiving chamber 30*a* can bias against the lower front portion of the portable electronic device 2 and prevent the portable electronic device 2 from flipping over during the battery charging and/or data transfer operation.

In another example shown in FIGS. 5A and 5B, the receiving chamber 30*a* is formed similarly and complement to the bottom portion of the portable electronic device 2 fitted with a cover case 4. As one skilled in the art will appreciate, the receiving area 30 can be formed in any of various other forms, such as described below in connection with one or more additional embodiments.

In one example, the receiving chamber 30*a* can be surrounded by a surrounding wall 32, which can at least partially snuggly surround a lower portion of the portable electronic device 2 fitted inside a cover case 4. The surrounding wall 32 can be formed to at least partially support and hold the portable electronic device 2 and its cover case 4 in place during the battery charging and/or data transfer operation (see FIGS. 5A and 5B). For example, the surrounding wall 32 is a continuous wall extending at least partially around the lower portion of the combined portable electronic device 2 and cover case 4 in the second working position. In one example, the surrounding wall 32 can assume a cup shape. In another example, the surrounding wall 32 can have at least one opening 32*a* for accommodating an additional support 16 on the docking base 10. As one skilled in the art will appreciate, the receiving area 30 on the device adapter 20 can be formed into various other forms, such as those described in the various embodiments below.

As FIG. 4 shows, the device adapter 20 can be removably fitted in the docking base 10 shown in FIG. 1. For example, the base portion 22*b* of the device adapter 20 can be positioned inside the receiving area 12 of the docking base 10. In one example, the base portion 22*b* is inserted into and held by the receiving chamber 12*a* of the docking base 10. The base portion 22*b* and the receiving chamber 12*a* are so formed that the base portion 22*b* is limited from lateral movement inside the receiving chamber 12*a*. In such a case, the base portion 22*b* of the device adapter 20 can be snuggly fitted inside the receiving chamber 12*a* in the docking base 10 to form an integrated assembly, which can in turn provide adequate support to the portable electronic device 2 in a second working position, as is shown in FIGS. 5A and 5B.

When the device adapter 20 is fitted in the docking base 10 of the docking station 1, the first contact port 24*a* on the device adapter 20 can electrically contact the contact port 14 in the docking base 10. As a result, the second contact port 24*b* on the device adapter 20 can be electrically connected to the contact portion 14 in the docking base 10 of the docking station 1. As is shown in FIG. 4, the second contact port 24*b* of the device adapter 20 is in an elevated position comparing to the contact port 14 in the docking base 10. In one example, the receiving area 30 in the device adapter 20 is positioned above the receiving area 12 and/or the receiving chamber 12*a* in the docking base 10. Comparing to the receiving area 12 in the docking base 10, the receiving area 30 in the device adapter 20 is less restrictive to the size and/or shape of the portable electronic device 2 to be used with the docking station 1 for battery charging and/or data transferring operation. Therefore, the second contact port 24*b* in the device adapter 20 can connect to portable electronic devices 2 of various sizes and/or forms, such as one fitted with a cover case 4, as is shown in FIGS. 5A and 5B.

In the example shown in FIGS. 5A and 5B, the assembled docking base 10 and device adapter 20 can be used to hold a portable electronic device 2 fitted with a cover case 4 in a second working position of the battery charging and/or data transfer operations. In such a second working position, the portable electronic device 2 together with its fitted cover case 4 can be placed in the receiving area 30 of the device adapter 20, which is held by the receiving area 12 of the docking base 10. In one example, the lower portion of the combined portable electronic device 2 and cover case 4 is seated and held inside the receiving chamber 30*a* of the device adapter 20. The device port on the portable electronic device 2 is made to electrically connect to the second contact port 24*b* on the device adapter 20.

Additionally or alternatively, the combined portable electronic device 2 and cover case 4 can be supported by other supporting mechanism to further stabilize the combined portable electronic device 2 and cover case 4 in the second working position during the battery charging and/or data transfer operation. In one example shown in FIGS. 5A and 5B, the combined portable electronic device 2 and cover case 4 are supported on the additional support 16 for added stability. In another example shown in FIG. 5A, the surrounding wall 32 can block the bottom portion of the combined portable electronic device 2 and cover case 4 and prevent such bottom portion from sliding forward. As one skilled in the art will appreciate, other supporting mechanism can be adopted to achieve the same purpose.

As FIGS. 5A and 5B show, the cover case 4 for the portable electronic device 2 can be in various forms for protecting the integrity or enhancing the appeal of the portable electronic device 2. For example, the cover case 4 can be formed in various shapes to snuggly fit onto the portable electronic device 2. The cover case 4 can be removably fitted onto the portable electronic device 2 covering a portion of the portable electronic device 2 for protection purposes and at the same time revealing its display screen and/or key pad for viewing and data entry purposes. In one example, the cover case 4 is made of a transparent material to allow the user to view the display screen and/or operate the key pad on the portable electronic device 2 through the cover case 4. The cover case 4 can be made of any of various materials, including but not limited to, plastic, silicone, rubber, leather, paper, or fabric materials.

Additionally or alternatively, the cover case 4 for the portable electronic device 2 can be formed in various shapes and/or sizes for protecting the integrity or enhancing the appeal of the portable electronic device 2. In one example, the cover case 4 can have a range of thickness depending on various factors, such as the use environment of the portable electronic device 2 and the user's preference. For example, the thickness of the cover case 4 can range from about 2 mm to about 3 mm. In one example, the thickness of the cover case 4 can be from about 5 mm to about 6 mm for enhanced protection of the portable electronic device 2, such as for example for use at a construction site or other areas in which the portable electronic device 2 is exposed to harsh weather or rough handling conditions. In another example, the thickness of the cover case 4 can be about 1 mm to result in a slim and compact portable electronic device 2 protected by a cover case 4. The cover case 4 can be designed to have various other thicknesses.

Although FIGS. 5A and 5B show that the receiving area 30 of the device adapter 20 is adapted to receive and support a portable electronic device 2 fitted with a cover case 4, the configuration of such receiving area 30 is not so limited. For example, the receiving area 30 of the device adapter 20 can be configured to receive a portable electronic device 2 without a cover case 4. Additionally or alternatively, the receiving area 30 of the device adapter 20 can be configured to receive a rechargeable battery 2' directly after it is removed from the portable electronic device 2.

Figure 6A:
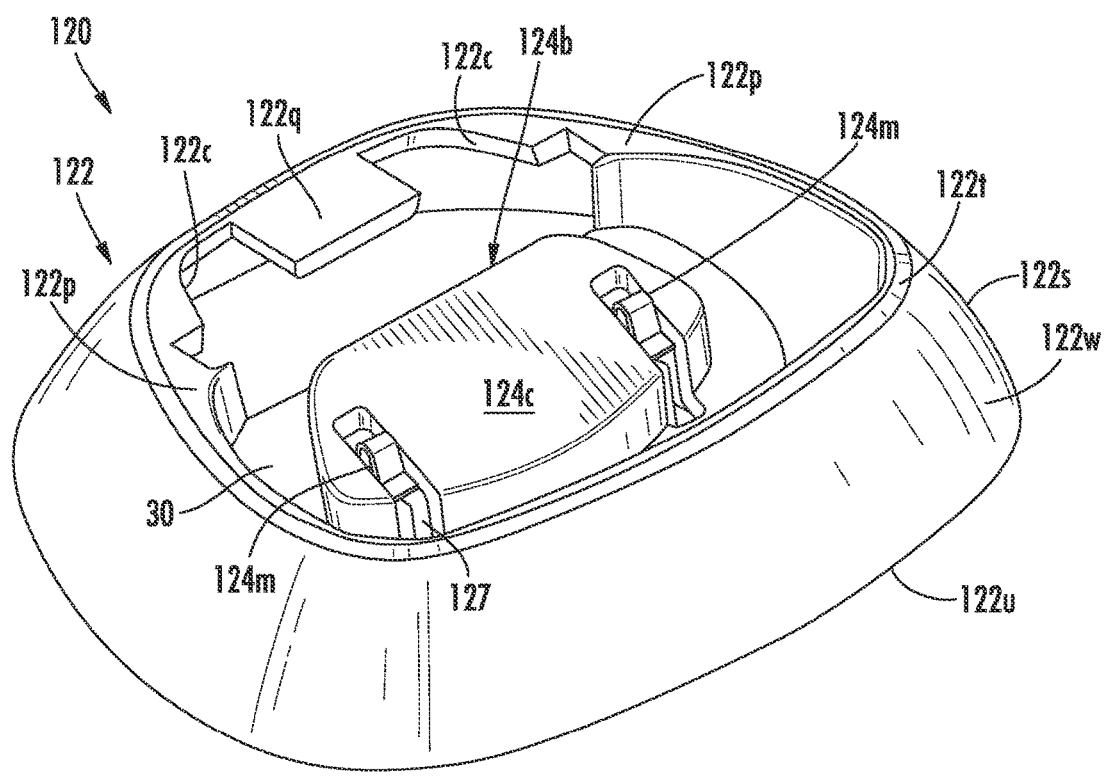
Figure 6B:
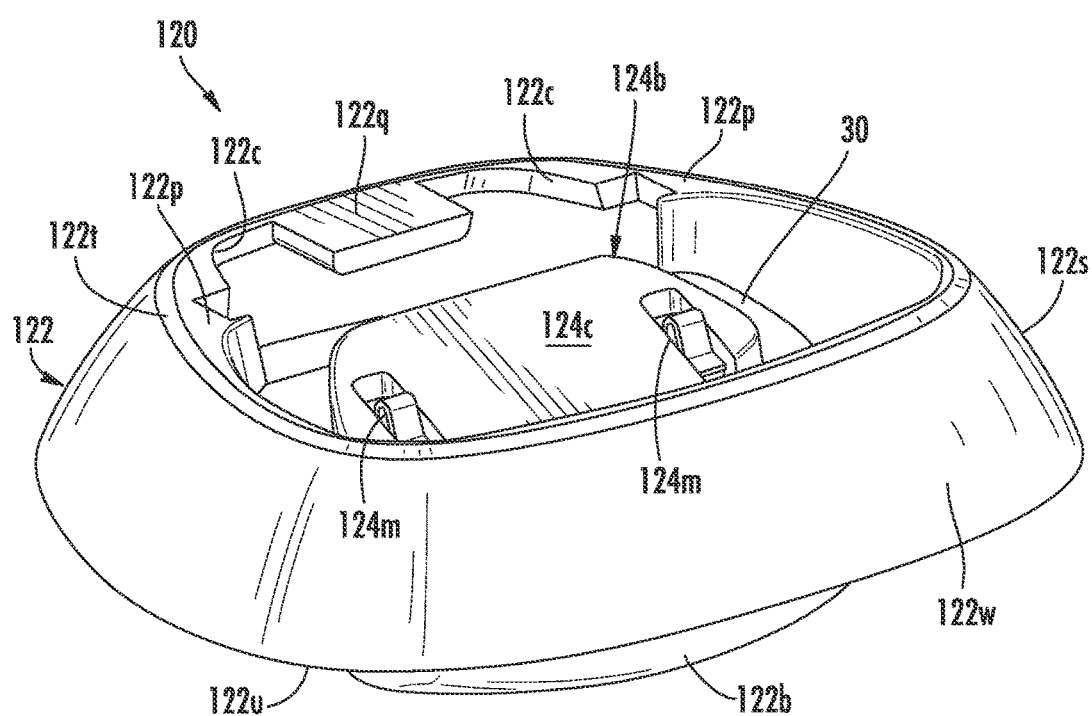

FIGS. 6A to 6G show a second embodiment of the device adapter 120, in which further details concerning the contact ports, electrical circuit, and electrical contacts of the device adapter 120 are shown and will be described below. As is best shown in FIGS. 6A and 6B, the device adapter 120 has first and second contact ports 124*a*, 124*b*, which are electrically connectable to the contact ports in the docking base 10 and the portable electronic device 2 during the battery charging and/or data transfer operation. In one example, the first contact port 124*a* is formed on the base portion 122*b* and compatible to those in the contact port 14 on the docking base 10. As one skilled in the art will appreciate, the first contact port 124*a* can be configured in various forms, such as a USB port, or a female pin-type port for a battery charging and/or data transfer operation.

The second contact port 124*b* is formed on the main adapter body 122 of the device adapter 120 for connecting to the device port in the portable electronic device 2. In the example shown in FIGS. 6A and 6B, the second contact port 124*b* can include a contact support 124*c* and electrical contact 124*m* supported in the contact support 124*c*. The contact support 124*c* of the second contact port 124*b* can be formed to support the contact port of the portable electronic device 2 during the second working position (see FIGS. 10A to 10C). In one example, the contact support 124*c* of the second contact port 124*b* has a height of at least the thickness of the cover case 4. Such a contact support 124*c* can extend and pass through an opening in the cover case 4 to reach the contact port in the portable electronic device 2 during the battery charging and/or data transfer operation.

The electrical contact 124*m* of the second contact port 124*b* can be formed to be compatible to those in device port of the portable electronic device 2. In one example, the electrical contact 124*m* can be any form of male contact, such as connecting pins 124*p*, formed to have sufficient length to reach the contact in the contact port of the portable electronic device 2 during the second working position. In another example, the electrical contact 124*m* can be in the form of a spring contact, which operates to facilitate the electrical contact between the second contact port 124*b* and the contact port of the portable electronic device 2 in the second working position. Various other types of the contact ports, such as a USB port, can be used in addition to or in place of the pin or spring type second contact port 124*b*, so long as they are compatible with the device port on the portable electronic device 2 during a battery charging and/or data transfer operation.

Figure 6C:
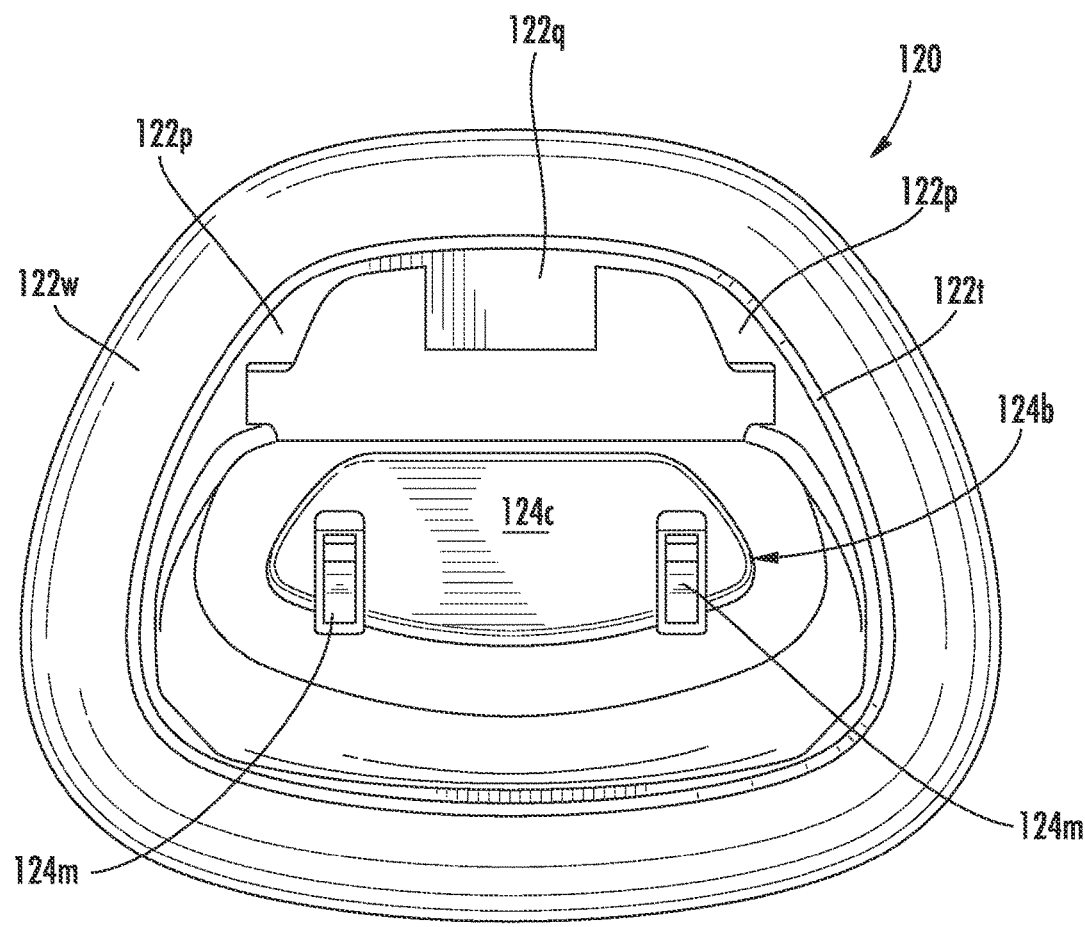
Figure 6D:
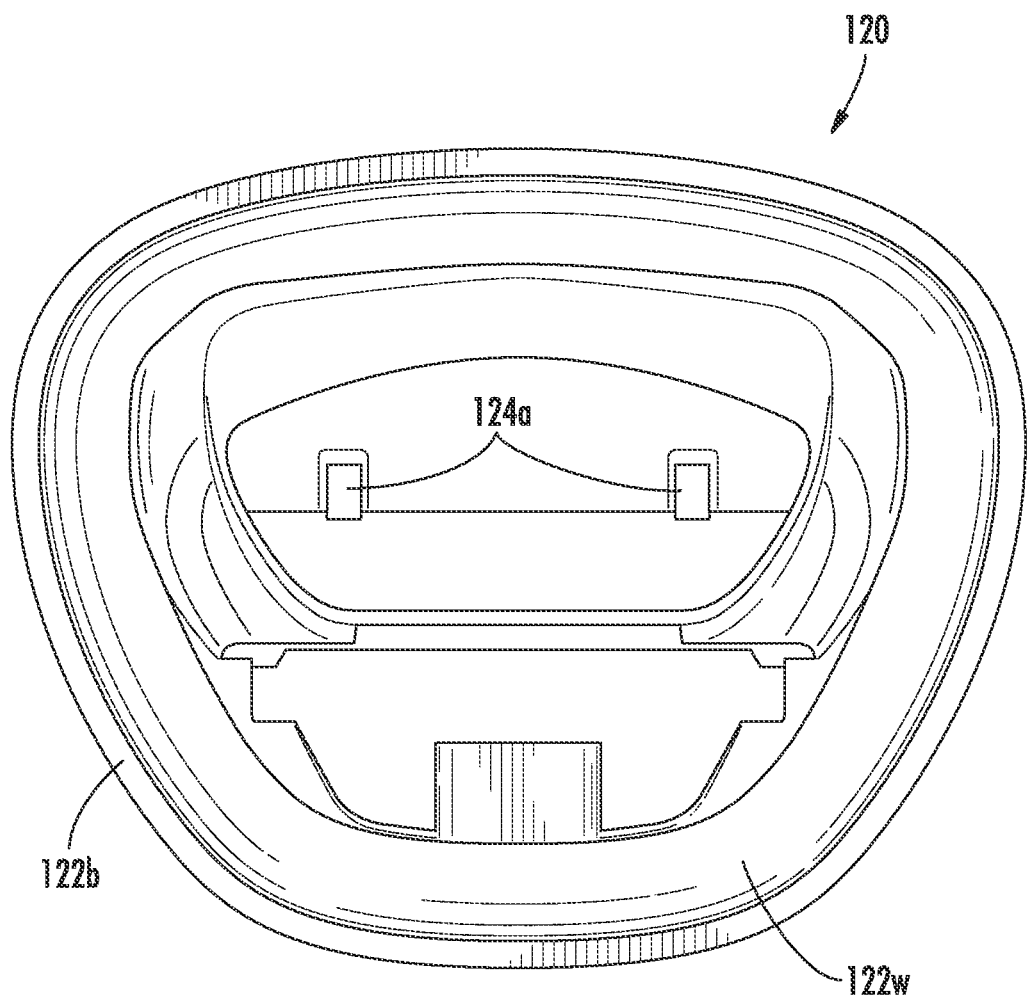
Figure 6E:
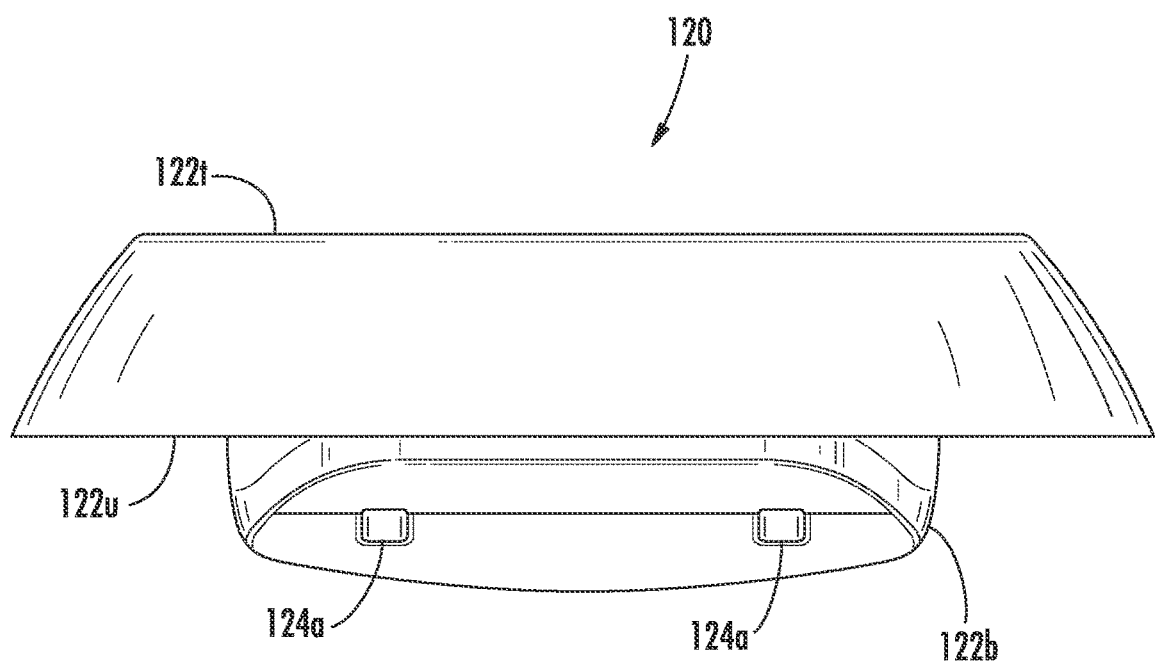
Figure 6F:
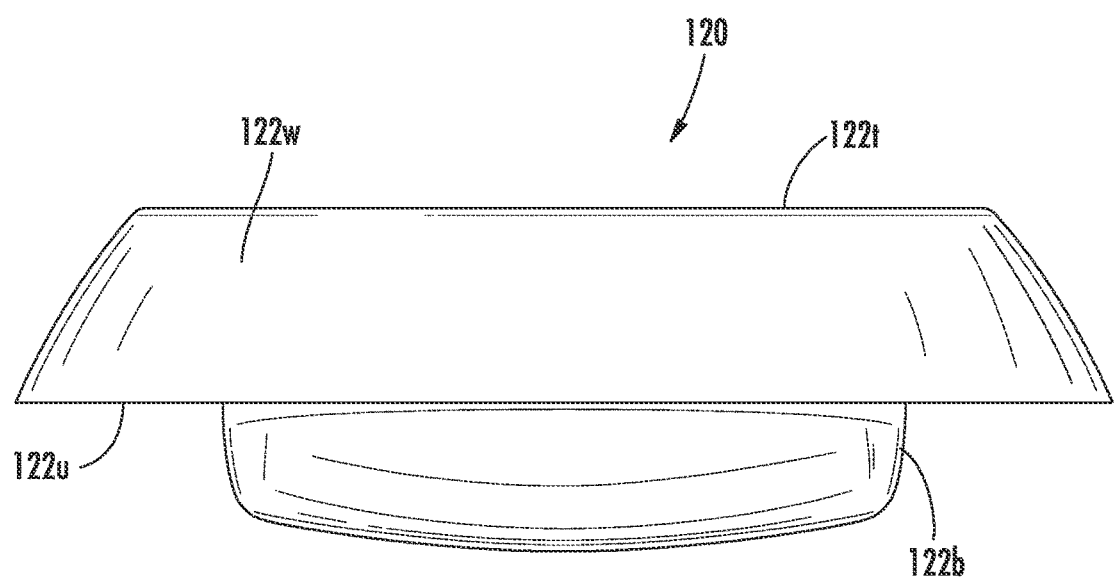
Figure 6G:
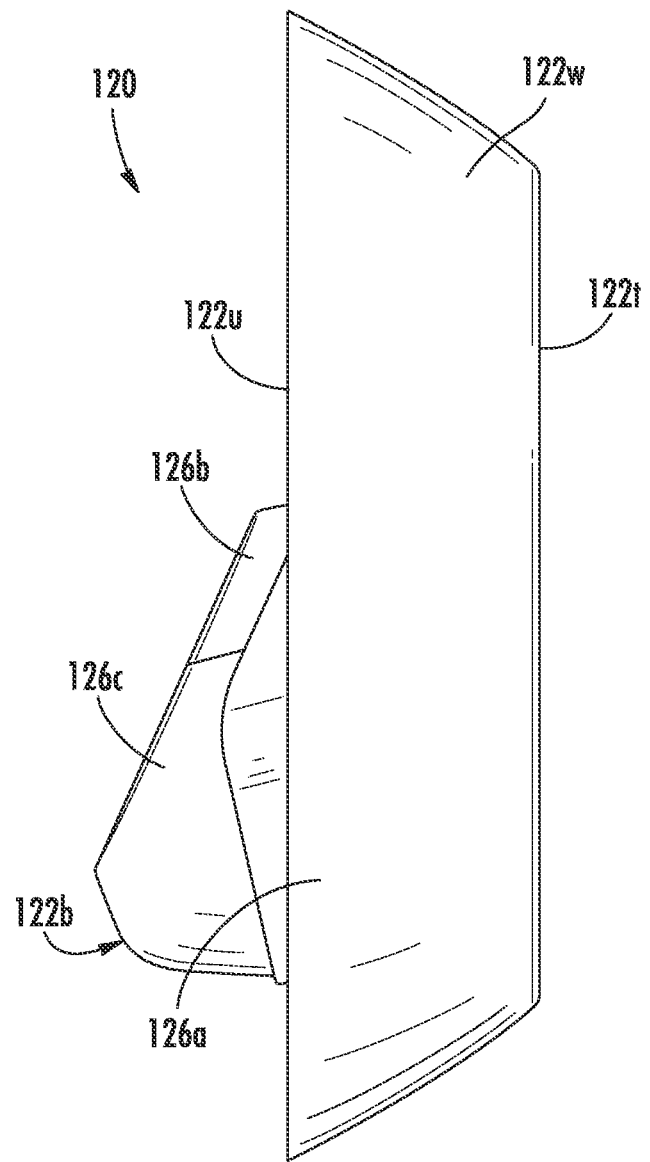
Figure 7A:
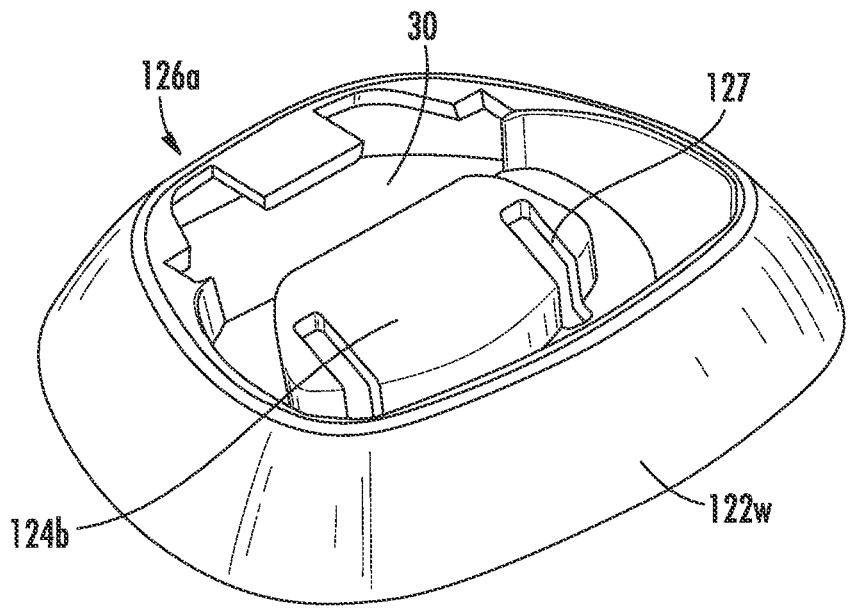
Figure 7B:
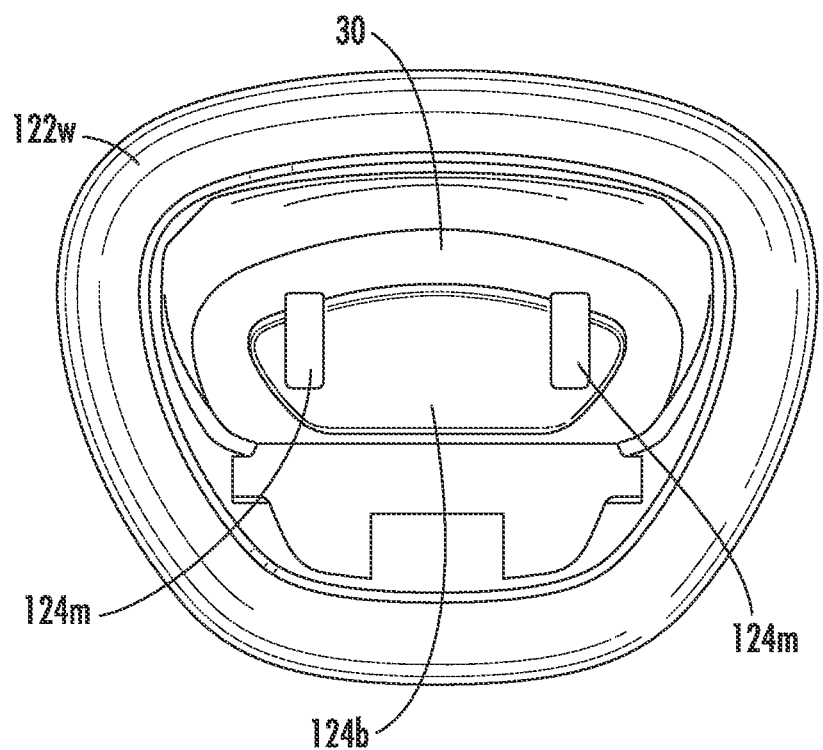
Figure 7C:
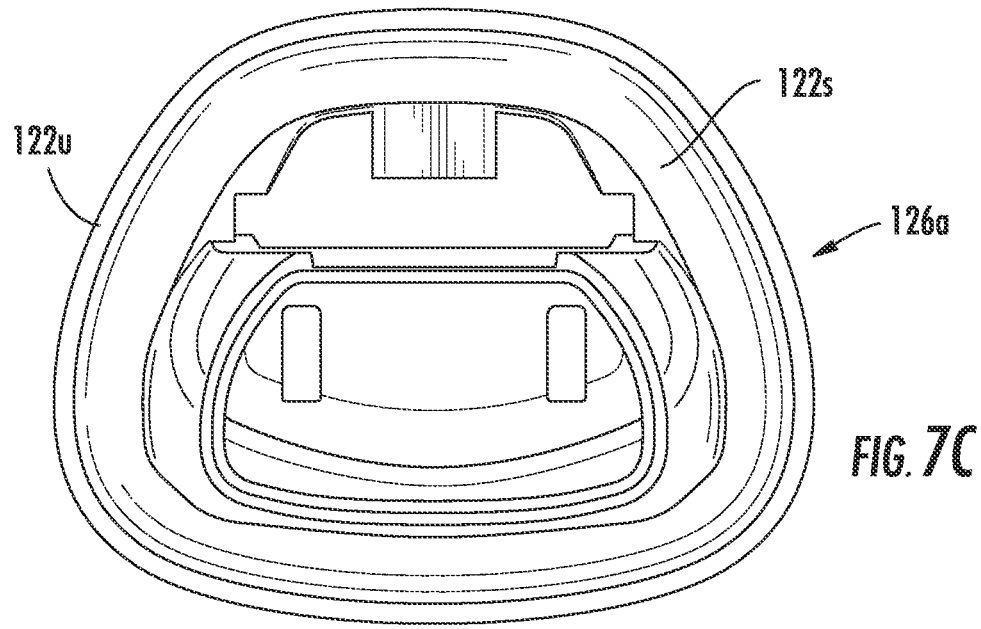
Figure 7D:
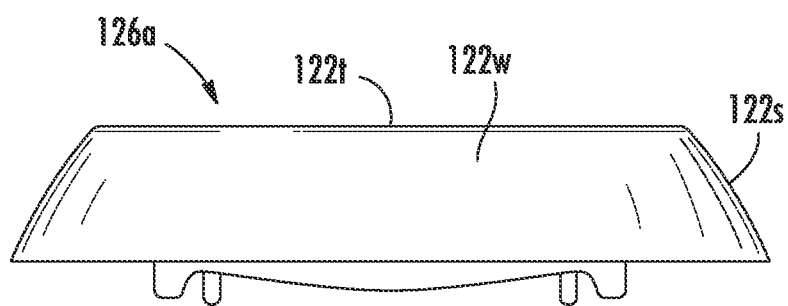
Figure 7E:
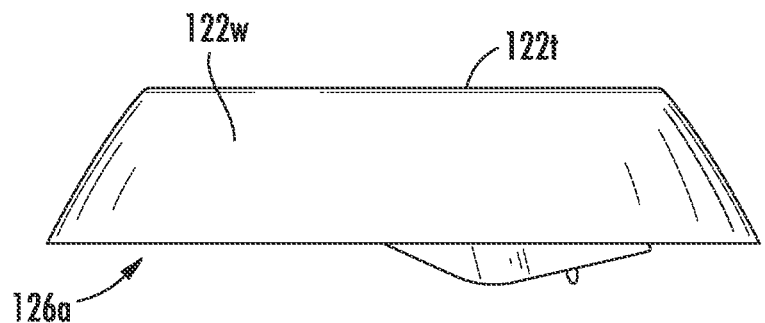
Figure 7F:
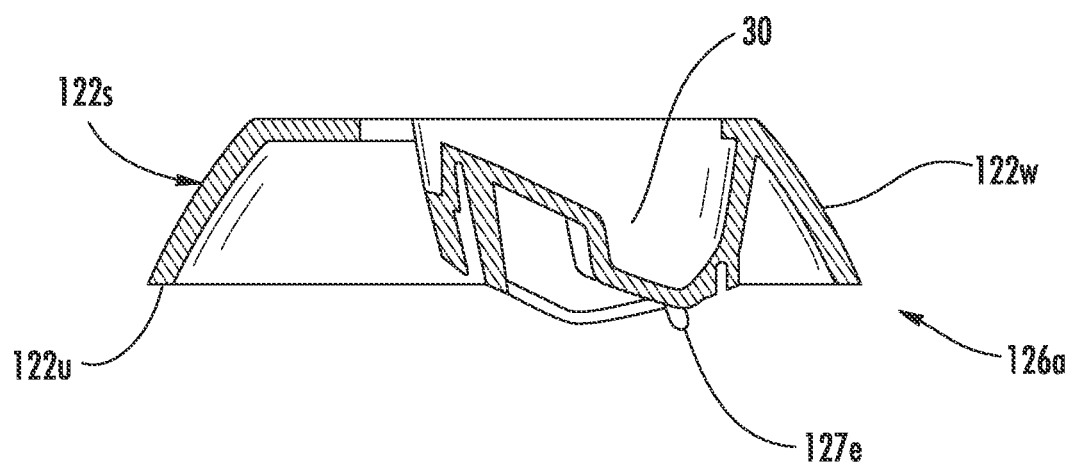

In the embodiment shown in FIGS. 6A to 6G, the main adapter body 122 of the device adapter 120 includes a skirt portion 122*s* extending laterally from and surrounding the receiving area 30 (see also the cross-sectional view in FIG. 7F). The skirt portion 122*s* can include a surrounding wall 122*w* formed to have varied forms. In one example, the surrounding wall 122*w* extends continuously in the circumferential direction to formed an enclose wall. Additionally or alternatively, the surrounding wall 122w can have a straight, tapered, or curved profile in an axial direction of the skirt portion 122s. In the example shown in FIGS. 6A to 6G, the surrounding wall 122w of the skirt portion 122s have a tapered curve profile. As one skilled in the art will appreciate, the surrounding wall 122w can be formed to have other profiles, such as those described in the variations and embodiments below.

In one example, the skirt portion 122s of the device adapter 120 is configured to support the device adapter 120 on the docking base 10. For example, the skirt portion 122s can be flared toward its bottom edge 122u. The flared bottom edge 122u can extend laterally beyond the receiving area 12 when the device adapter 120 is assembled with the docking base 10. In such a case, the flared bottom edge 122u can rest on the top surface of the docking base 10 when the device adapter 120 is used with the docking base 10. As one skilled in the art will appreciate, the skirt portion 122s can be formed to have various other profiles, such as those described in the embodiments or variations below.

Additionally or alternatively, the top edge 122t of the skirt portion 122s can be formed in various shapes. As is best shown in FIGS. 6A and 6B, at least part of the top edge 122t of the skirt portion 122s can be formed to track part of the lower portion of the combined portable electronic device 2 and cover case 4 (see also FIG. 10A). In one example, such part of the top edge 122t of the skirt portion 122s can thus support and hold the lower portion of the combined portable electronic device 2 and cover case 4 in place when the device adapter 120 is used in the second working position. In one example best shown in FIGS. 6C and 10A, the front part of the top edge 122t of the skirt portion 122s can be formed to conform the lower front portion of the combined portable electronic device 2 and cover case 4 and thus hold the same in place during the normal use of the device adapter 120.

In another example best shown in FIGS. 6A to 6C, one or more lateral protrusions 122p, 122q are formed extending inwardly from the top edge 122t of the skirt portion 122s. In one example, one or more of the lateral protrusions 122p, 122q can provide additional support to the combined portable electronic device 2 and cover case 4 when the device adapter 120 is in normal use (see also FIGS. 10A and 10B). For example, the lateral protrusions 122p, 122q can cooperate with the front part of the top edge 122t of the skirt portion 122s to hold the combined portable electronic device 2 and cover case 4. As a result, the combined portable electronic device 2 and cover case 4 can be prevented from undesired lateral movement in the device adapter 120 during the battery charging and/or data transfer operation. Additionally or alternative, when the device adapter 120 is in normal use during the battery charging and/or data transfer operation, the lateral protrusions 122p, 122q on the top edge 122t of the skirt portion 122s can cover or seal the interior of the device adapter 120.

In a further example best shown in FIGS. 6A to 6C, the rear part of the top edge 122t can be formed to have a profile to cooperate with one or more additional supports 16 on the docking base 10. For example, the rear part of the top edge 122t has a curved profile 122c that matches a curved portion 16c of the additional support 16. After the device adapter 20 is fitted with the docking base 10 (see, e.g., FIG. 10B), such curved rear parts 122c of the top edge 122t surround the curved portions 16c of the additional support 16, while the lateral protrusion 122q (located between the curved rear parts 122c) extends between the prongs 16a of the additional support 16. Such a configuration can assist in securing the device adapter 120 on the docking case 10 during the battery charging and/or data transfer operation and preventing the device adapter 120 from laterally shifting away from the working position.

The device adapter 120 can be formed in various ways. In one example, the device adapter 120 can be constructed by assembling multiple adapter parts 126a, 126b, 126c, which can be separately formed to facilitate the manufacture of the device adapter 120.

FIGS. 7A to 7F are various views of the first adapter part 126a of the device adapter 120 including the second contact port 124b, the receiving area 30, and the skirt portion 122s as described above. As is shown in the cross-sectional view in FIG. 7F, the first adapter part 126a of the device adapter 120 also contains an electrical connector 127 for connecting the electrical contact 124m in the second contact port 124b to the first contact port 124a. As is best shown in FIGS. 6A and 7A to 7F, the electrical connector 127 extends from the electrical contact 124m in the second contact port 124b to the bottom of the first adapter part 126a and has a free end 127e (see cross-sectional view in FIG. 7F). The free end 127e of the electrical connector 127 can extend to the first contact port 124a formed in the second and third adapter parts 126b, 126c of the device adapter 120.

FIGS. 8A to 8F illustrate the details of the second adapter part 126b of the device adapter 120. FIGS. 9A to 9E illustrate the details of the third adapter part 126c of the device adapter 120. The second and third adapter parts 126b, 126c of the device adapter 120 can be joined to each other and to the first adapter part 126a to form the device adapter 120. One or more connector ports 127c can be at least partially formed on at least one of the second and third adapter parts 126b, 126c. In one example, the second and third adapter parts 126b, 126c of the device adapter 120 are each formed with partial connector ports, which can be combined to form one or more connector ports 127c as described below.

When the second and third adapter parts 126b, 126c of the device adapter 120 are joined to each other, the connector ports 127c are formed. The connector ports 127c are adapted to receive the free ends 127e of the electrical connector 127 to form the first contact port 124a, when the second and third adapter parts 126b, 126c are joined to the first adapter part 126a. The resultant first contact port 124a is electrically connectable with the contact port 14 on the docking base 10. Various other types of the first contact port 124a, such as a USB type contact port, can be used in addition to or in place of the pin-type first contact port 124a, so long as they are compatible with the contact port 14 on the docking base 10.

The various adapter parts 126a, 126b, 126c of the device adapter 120 can be separately formed and assembled together to form the device adapter 120. In one example, the adapter parts 126a, 126b, 126c are separately molded, such as from a plastic material. One or more fasteners are provided on the adapter parts 126a, 126b, 126c to facilitate the connection of one another. In one example, one or more snap-type fasteners 128s are formed on the second and third adapter parts 126b, 126c to connect these parts. In another example, the second and third adapter parts 126b, 126c can be formed with snap-type fasteners 128t for connecting to a complementary snap-type fastener on the first adapter part 126a of the device adapter 120. In a further example, one or more plug-type fasteners 128p are formed on the first adapter part 126a and at least one of the second and third adapter parts 126b, 126c to connect the different parts. As one skilled in the art will appreciate, various other types of fasteners can also be used for the same purpose.

When the various adapter parts 126a, 126b, 126c of the device adapter 120 are joined to one another, the second and third adapter parts 126b, 126c form part of the base portion 122b of the device adapter 120, as is shown in FIG. 6G. In the resulting device adapter 120, a female first contact port 124a is formed and located on the base portion 122b of the device adapter 120 and connectable with a male contact port 14 on the docking base 10.

Figure 10A:
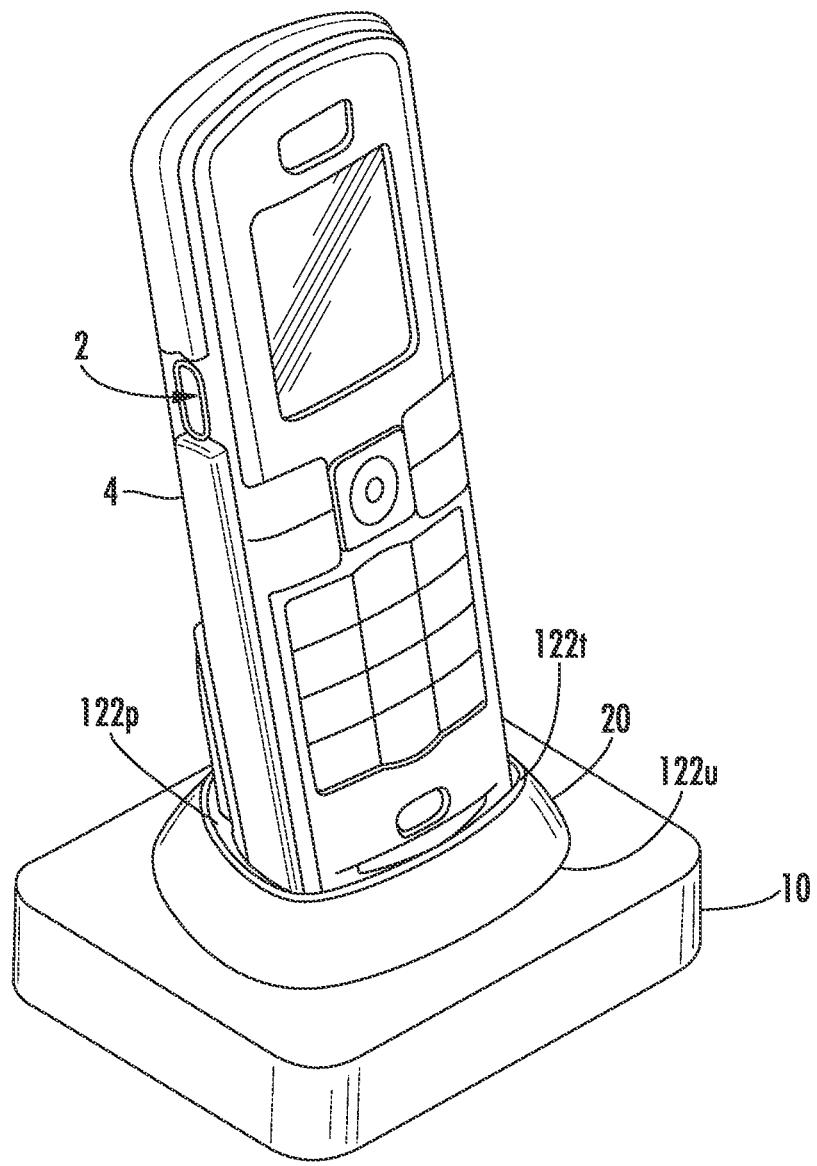
FIGS. 10A to 10C are various views showing a docking station assembled with the device adapter of FIGS. 6A to 6G and used in a second working position for receiving a portable electronic device.
Figure 10B:
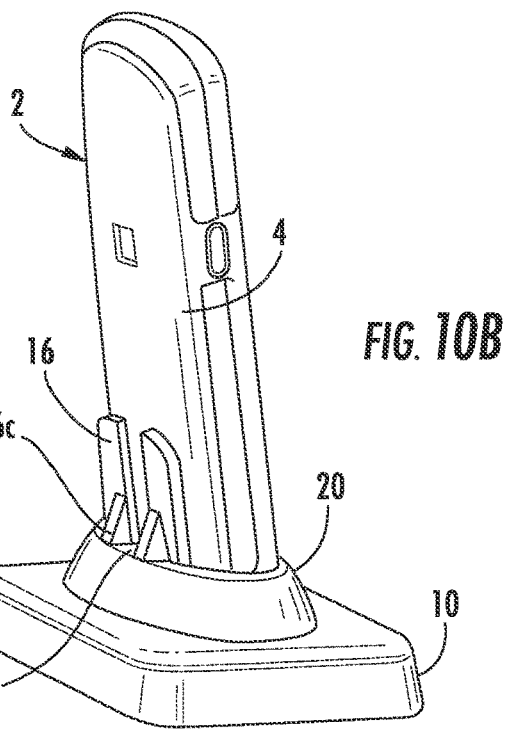
Figure 10C:
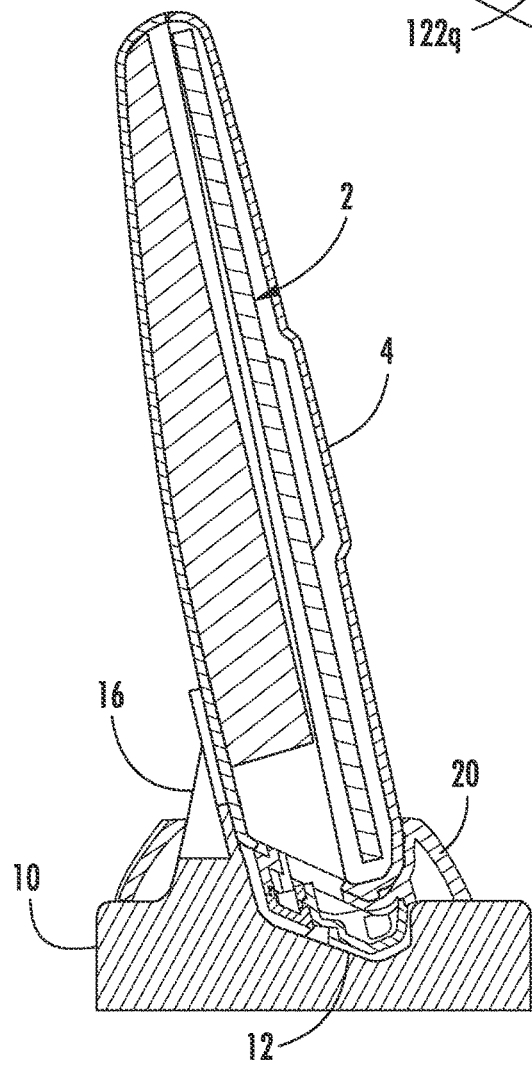

FIGS. 10A to 10C illustrate the device adapter 120 being used in a docking base 10 to receive the combined portable electronic device 2 and cover case 4 during the battery charging and/or data transfer operation in the second working position. The docking base 10 is similar to that described in the above embodiment.

Figure 11:
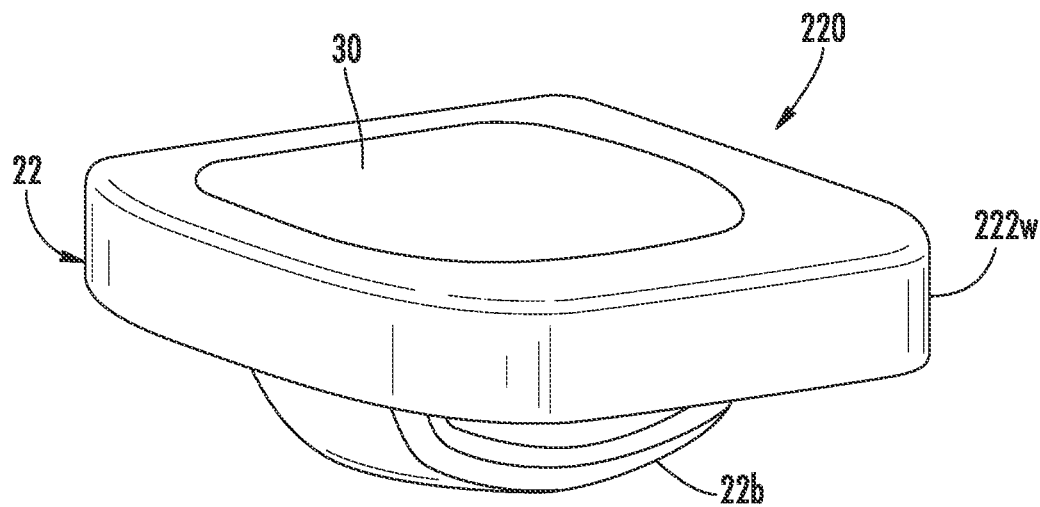
FIG. 11 shows a device adapter formed according to a third embodiment.
Figure 12:
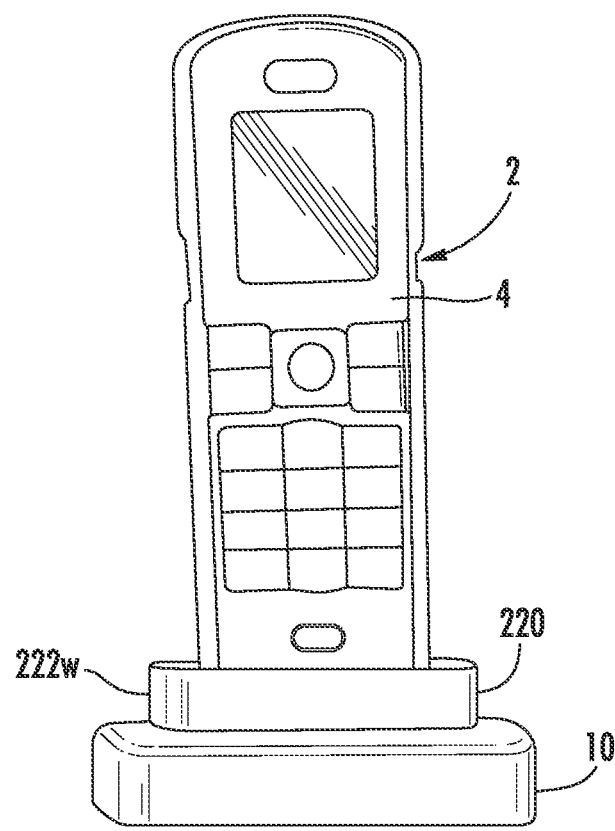
FIG. 12 shows a docking station being assembled with the device adapter of FIG. 11 and used in a second working position for receiving a portable electronic device.

FIG. 11 shows a device adapter 220 formed according to a third embodiment. In this embodiment, the surrounding wall 222w has straight profile in the axial direction, as best illustrated in FIG. 12.

Figure 13:
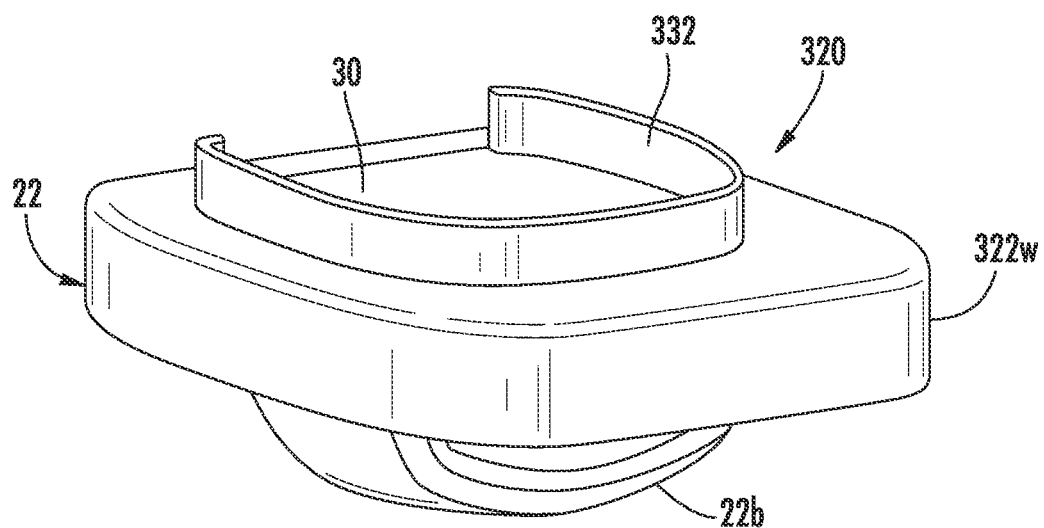
FIG. 13 shows a variation of the device adapter shown in FIG. 11.

FIG. 13 shows a variation of the device adapter 220 in FIG. 11. In this variation, an additional support can be provided to keep the combined portable electronic device 2 and cover case 4 in position during the battery charging and/or data transfer operation. In one example, a supporting wall 332 can be formed on the main adapter body 222 to hold the contact portion of the combined portable electronic device 2 and cover case 4 in place during the battery charging and/or data transfer operation. The supporting wall 332 can be elevated from the main adapter body 222 and positioned to be in contact with the combined portable electronic device 2 and cover case 4 at one or more locations. In the example shown in FIG. 13, the supporting wall 332 is shown as a continuous wall. In another example, the supporting wall 332 can be multiple discontinued segments. One skilled in the art will appreciate that the supporting wall 332 can be formed in various other forms to provide additional support to the combined portable electronic device 2 and cover case 4 during the battery charging and/or data transfer operation.

Figure 14:
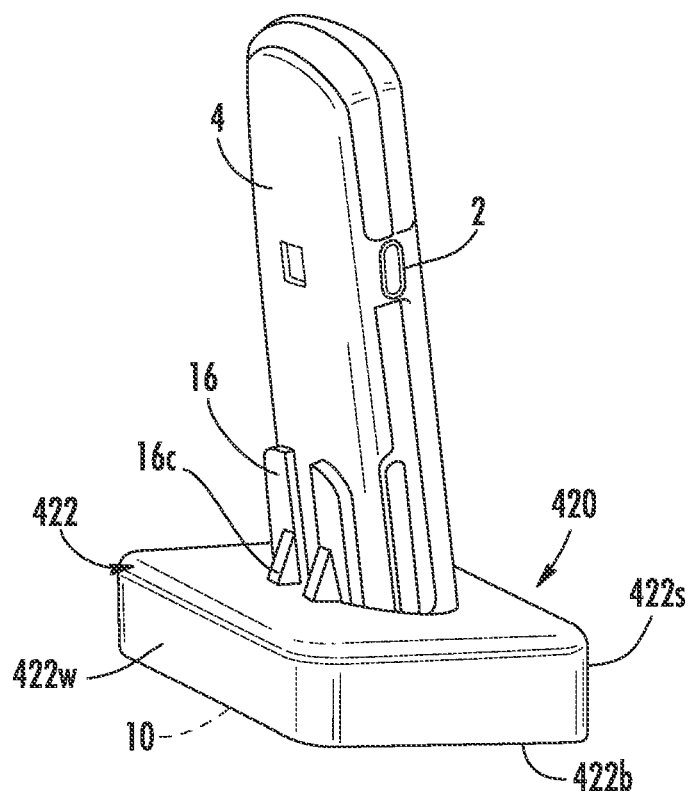
FIG. 14 shows a device adapter formed according to a fourth embodiment and used to receive a portable electronic device.

FIG. 14 shows a device adapter 420 formed according to a fourth embodiment. In this embodiment, the main adapter body 422 of the device adapter 420 has a skirt portion 422s extending downwardly to a bottom edge 422b. The skirt portion 422s of the device adapter 420 has a greater height than that of the docking base 10 (enclosed by the skirt portion 422). Therefore, when the docking base 10 and the device adapter 420 are assembled and used in the second working condition, the skirt portion 422s extends laterally over the docking base 10 while the surrounding wall 422w of the skirt portion 422s encloses and conceals the remaining docking base 10, as is shown in FIG. 14.

In a further embodiment, any of the above described device adapters 20, 120, 220 can be formed with multiple second contact ports 24b, or 124b to be connected to multiple portable electronic devices 2. For example, the device adapter 20 can be formed with more than one second contact ports 24b. Each of these second contact ports 24b is electrically connectable to the first contact port 24a, which in turn electrically connectable to the contact port 14 on the docking base 10. Suitable electrical circuit can be employed to adjust the output voltage of a second contact port 24b according to the type of portable electronic device 2 that the second contact port 24b is to be connected to. Such multiple second contact ports 24b can be configured to electrically connect to a portable electronic device different from the portable electronic device 2. For example, the device adapter 20 can be used in a battery charging operation for both the portable electronic device 2 and a spare battery (not shown) of the portable electronic device 2. If desired, additional support mechanism, such as surrounding walls 32, can be used to provide support to the portable electronic device 2 and/or its spare battery during the charging operation.

Figure 15:
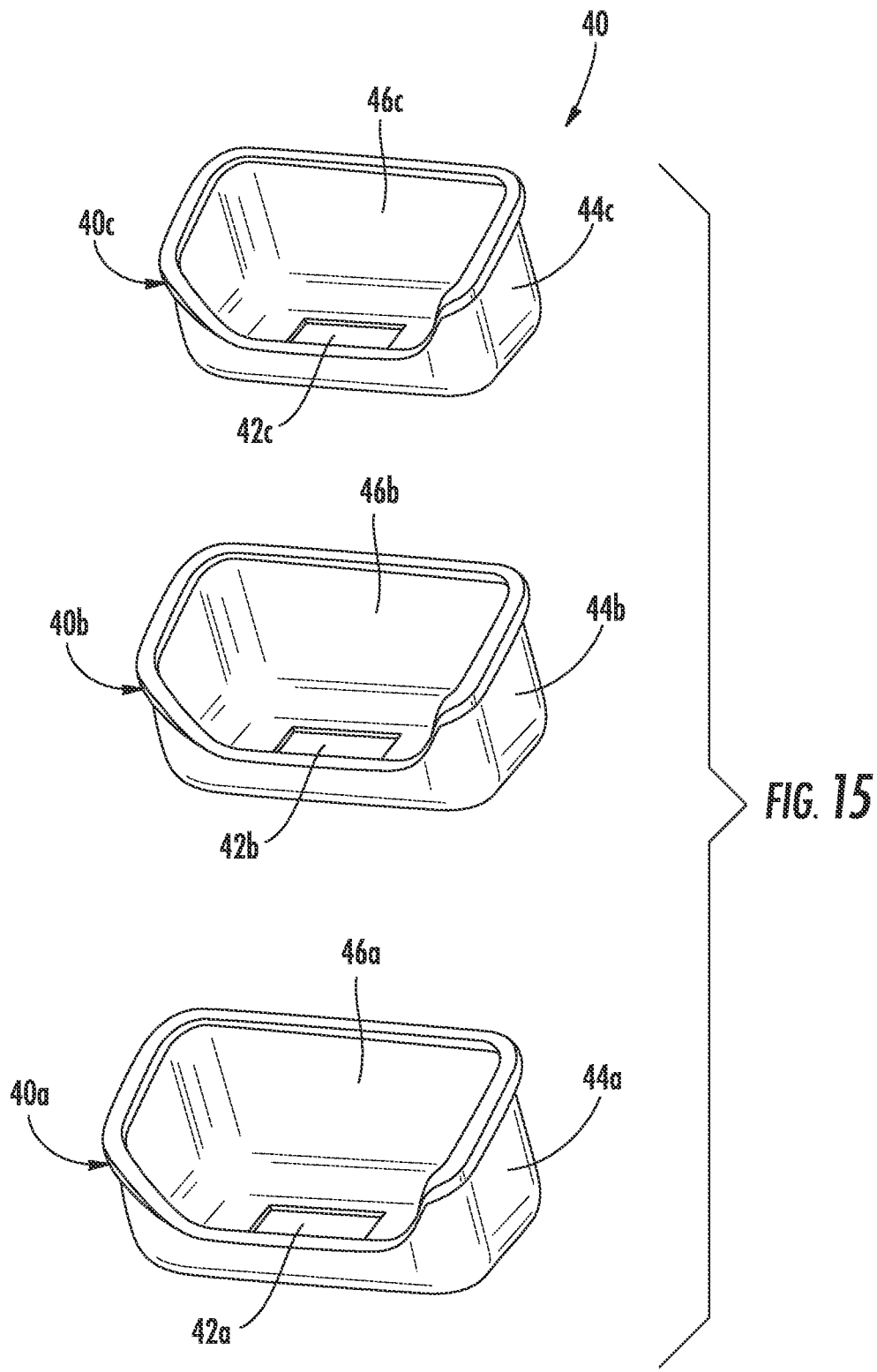
FIG. 15 is an exploded perspective view of stackable adapter inserts formed according to a fifth embodiment.

FIG. 15 shows a further embodiment, in which a plurality of stackable adapter inserts 40a, 40b, 40c are provided and can be used together with a device adapter 20 shown in FIGS. 3A and 3B. For example, one or more of such stackable adapter inserts 40a, 40b, 40c can be formed to fit inside the receiving area 30 of the device adapter 20. In one example, such stackable adapter inserts 40a, 40b, 40c can each be configured to support a portable electronic device 2 fitted with a cover case 4 of a different thickness or without a cover case. In another example, one or more of the stackable adapter inserts 40a, 40b, 40c can be configured to directly support a rechargeable battery 2' after it is removed from the corresponding portable electronic device 2. In the example shown in FIG. 15, each of the stackable adapter inserts 40a, 40b, 40c is formed with a respective aperture 42a, 42b, 42c to allow the device port on the portable electronic device 2 to access the second contact port 24b on the device adapter 20. When one or more of such stackable adapter inserts 40a, 40b, 40c are used together with the device adapter 20, such stackable adapter inserts 40a, 40b, 40c can alter the size of the receiving area 30 to accommodate a portable electronic device 2 fitted with cover cases 4 of various thicknesses or without a cover case.

In one example, the outermost adapter insert 40a can have an exterior surface 44a formed to be snuggly fitted inside the receiving area 30 of the device adapter 20. The interior chamber 46a of the outermost adapter insert 40a can be shaped and sized to snuggly fit the portable electronic device 2 fitted with a thinner cover case 4. When such outermost adapter insert 40a is placed in the receiving area 30 of the device adapter 20 and used together with the docking base 10, the combined docking base 10, the device adapter 20, and the outermost adapter insert 40a can accommodate and hold a portable electronic device 2 fitted with a thinner cover case 4.

One or more stackable intermediate adapter insert 40b can be provided between the outermost adapter insert 40a and an innermost adapter insert 40c, which will be described in details below. Each intermediate adapter insert 40b can have an exterior surface 44b formed to be snuggly fit inside an adjacent larger sized adapter insert 40a, 40b. In the example shown FIG. 15, the intermediate adapter insert 40b is formed to be snuggly fit in the interior chamber 46a of the outermost adapter insert 40a.

Additionally or alternatively, the interior chamber 46b of each intermediate adapter insert 40b is formed to snuggly fit an adjacent smaller sized adapter insert 40b, 40c. In the example shown FIG. 15, the interior chamber 46b of the intermediate adapter insert 40b is formed to snuggly fit the innermost adapter insert 40c therein. When such intermediate adapter insert 40b is used in addition to the outermost adapter insert 40a, the combined docking base 10, device adapter 20, and adapter inserts 40a, 40b can support the portable electronic device 2 fitted with an even thinner cover case 4 or without a cover case.

The innermost adapter insert 40c can be formed to be snuggly fit inside the smallest intermediate adapter insert 40b. The interior chamber 46c of the innermost adapter insert 40c can be shaped and sized to accommodate and support the portable electronic device 2 with the thinnest cover case 4. When the innermost adapter insert 40c is used together with the one or more intermediate adapter inserts 40*b* and the outermost adapter insert 40*a*, the combined docking base 10, device adapter 20, and adapter inserts 40*a*, 40*b*, 40*c* can support the portable electronic device 2 fitted with its thinnest cover case 4.

The thickness of each of the stackable adapter inserts 40*a*, 40*b*, 40*c* can be determined depending on the thickness of the various cover cases 4 available to a particular portable electronic device 2. The adapter inserts 40*a*, 40*b*, 40*c* so formed can either directly support or otherwise be combined to support the combination of the portable electronic device 2 and a selected cover case 4. When one or more of such stackable adapter inserts 40*a*, 40*b*, 40*c* are used together with the device adapter 20, such stackable adapter insert 40*a*, 40*b*, 40*c* can alter the size of the receiving area 30 to accommodate a portable electronic device 2 fitted with cover cases 4 of various thicknesses. When none of such stackable adapter inserts 40*a*, 40*b*, 40*c* is used in the receiving area 30 of the device adapter 20, the receiving area 30 can accommodate and support the combined portable electronic device 2 and the thickest cover case 4, as is described in the embodiments above.

In another embodiment, the adapter inserts 40*a*, 40*b*, 40*c* can be formed to be accommodated and supported in the receiving area 30 of the device adapter 20. For example, the adapter inserts 40*a*, 40*b*, 40*c* can have their respective exterior surfaces 44*a*, 44*b*, 44*c* formed to be snuggly fitted inside the receiving chamber 30*a* of the device adapter 20. The interior chambers 46*a*, 46*b*, 46*c* of the respective adapter inserts 40*a*, 40*b*, 40*c* can be shaped and sized to receive and hold various portable electronic devices 2 and/or rechargeable batteries 2' as mentioned above. When using these adapter inserts 40*a*, 40*b*, 40*c* and the device adapter 20, the battery charging and/or data transfer operation of different types portable electronic devices 2 and/or rechargeable batteries 2' can be carried out on the same docking station 1. For example, the interior chambers 46*a*, 46*b*, 46*c* of the respective adapter inserts 40*a*, 40*b*, 40*c* can be shaped and sized to receive and hold a mobile phone, MP3 player, and a spare battery. In another example, the interior chambers 46*a*, 46*b*, 46*c* of the respective adapter inserts 40*a*, 40*b*, 40*c* can be shaped and sized to receive and hold the portable electronic device 2 with cover cases 4 of different thicknesses or without a cover case.

Figure 16:
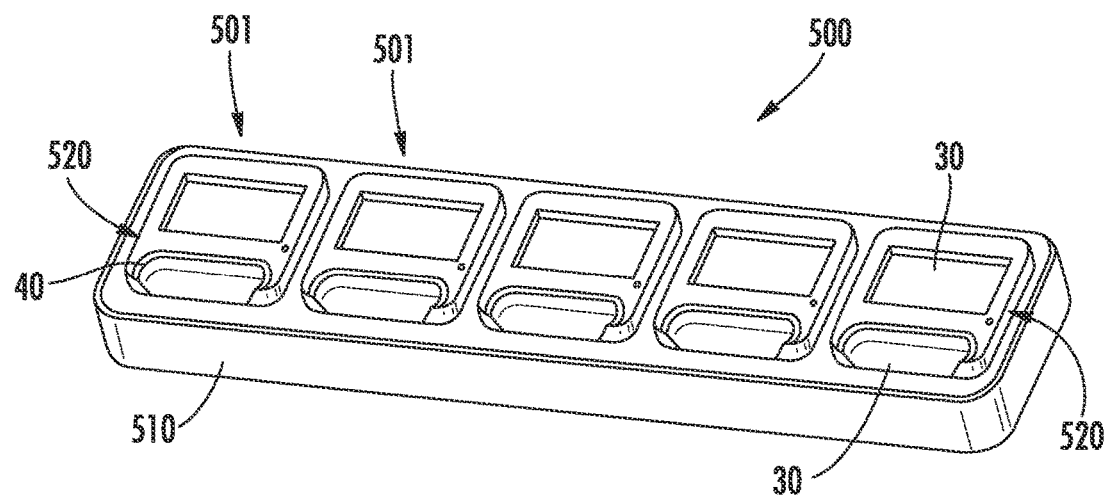
FIG. 16 shows a docking station module assembled with multiple docking stations formed according to a sixth embodiment.

FIG. 16 shows a docking station module 500 formed according to a fifth embodiment. The docking station module 500 can be formed to have multiple docking stations 501, which are similar to the above described docking stations 1. For example, each of the multiple cocking stations 501 can have a receiving area 12 configured to removably receive a device adapter 520 as will be described in further details below. Although the docking station module 500 in FIG. 16 is shown to have five docking stations 501, one skilled in the art will appreciate that the docking station module 500 can be formed to have a different number of docking stations 501.

Figure 17:
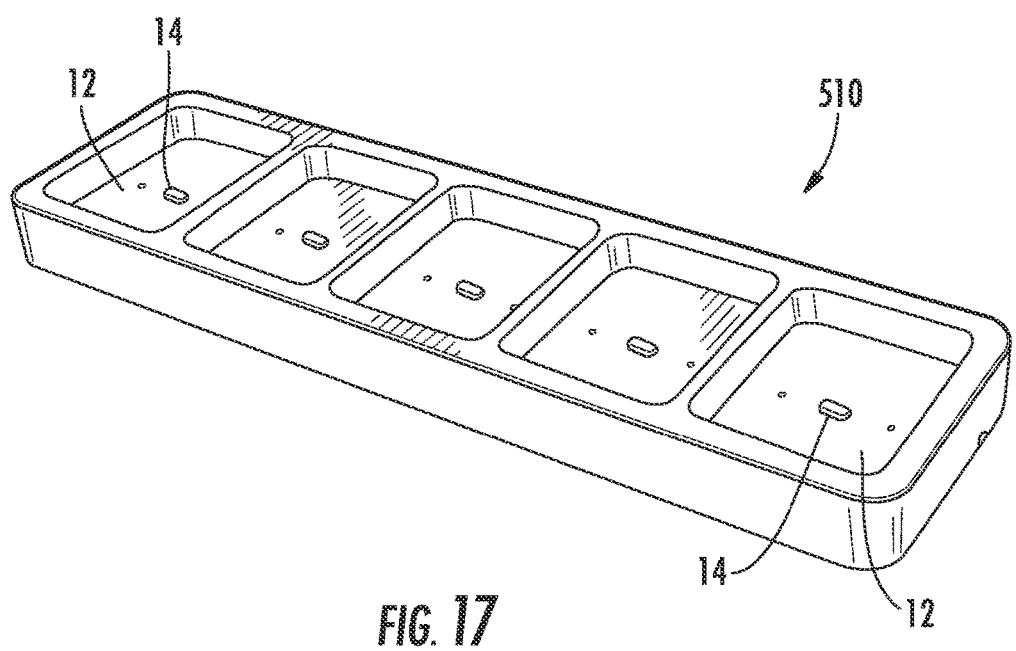
FIG. 17 is a perspective view of the module base in the docking station module shown in FIG. 16.

As is shown in FIG. 17, the docking station module 500 can have a single piece docking base 510, which can be formed by integrating the docking bases of the multiple docking stations 501. The single piece docking base 510 can be formed with multiple receiving areas 12, in which contact ports 14 are provided as described above. In the example of FIG. 17, the multiple receiving areas 12 in the single piece docking base 510 can be formed substantially the same to one another. In such a case, any of these multiple receiving areas 12 in the single piece docking base 510 can be used to receive a device adapter 520 with a compatible base portion 522*b*, thereby simplifying the assembly of the docking station module 500.

Figure 18A:
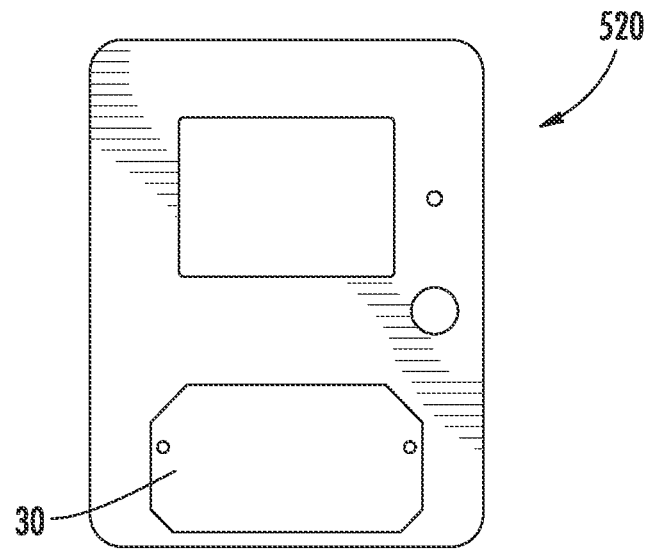
FIGS. 18A and 18B show various views of a docking station in FIG. 16, wherein the docking station of FIG. 18B is shown to be fitted with a device adapter.
Figure 18B:
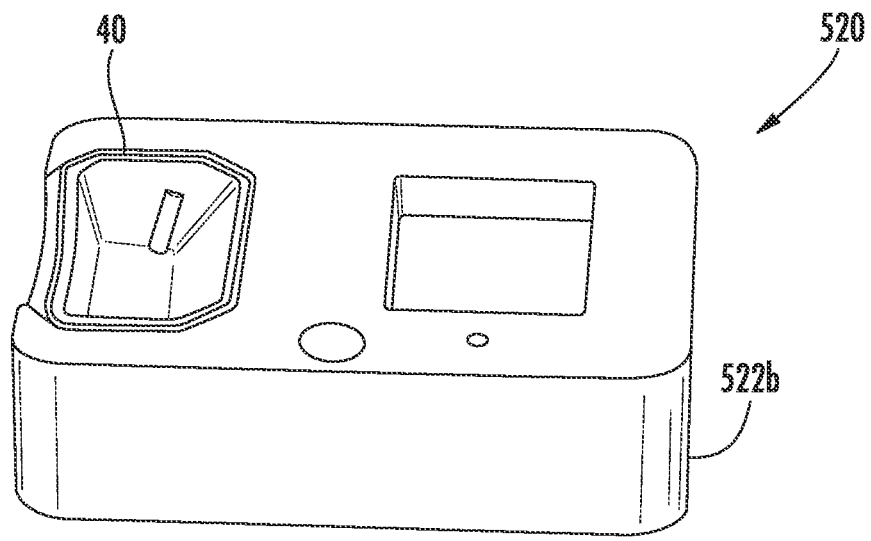

FIGS. 18A and 18B show one of such device adapters 520, which can be formed similarly to the device adapters 20, 120, 220 described above or to those described below. In one example, the various device adapters 520 can have substantially the same base portions 522*b*. In such as case, any one of such various device adapters 520 can be used in the single piece docking base 510, thereby simplifying the assembly of the docking station module 500 and increasing interchangeability of the device adapters 520. In another example where the receiving areas 12 in the single piece docking base 510 are similarly formed, the various device adapters 520 can be selectively used any of the receiving areas 12 in the single piece docking base 510, thereby increasing interchangeability of the device adapters 520 and simplifying the battery charging and/or data transferring operation.

The multiple device adapters 520 used in docking station module 500 can be formed to have different receiving areas 30 for receiving portable electronic devices 2 of different shapes and/or sizes. As is discussed above, such receiving areas 30 of the device adapter 520 can be configured to receive a portable electronic device 2 without or without a cover case 4. Additionally or alternatively, the device adapter 520 can be configured to have the receiving area 30' for receiving a rechargeable battery 2' directly after it is removed from the portable electronic device 2. One or more stackable adapter inserts 40 can be used together with a device adapter 520 as is illustrated in FIG. 18B. The different receiving areas 30 in the multiple device adapters 520 and/or the one or more stackable adapter inserts 40 can increase the versatility of the docking station module 500 for charging and/or transferring data to and from the various portable electronic devices 2 during the operation of the docking station module 500.

Figure 19:
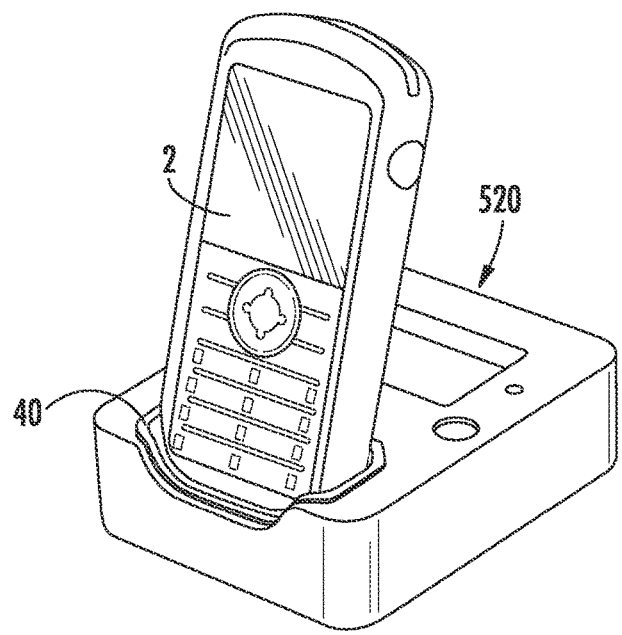
FIG. 19 shows the docking stations of FIGS. 18A and 18B being used to receive a portable electronic device.

In an alternative embodiment illustrated in FIG. 19, one or more of the device adapters 520 can be used in a stand-alone position, without the docking base 510. In such a case, the device adapter 520 is used as a docking station. For example, the device adapter 520 can be configured to connect to a standard power source (e.g., standard AC outlet, an automobile 12V supply, or a low voltage 5V supply) by a connecting cable.

Figure 20:
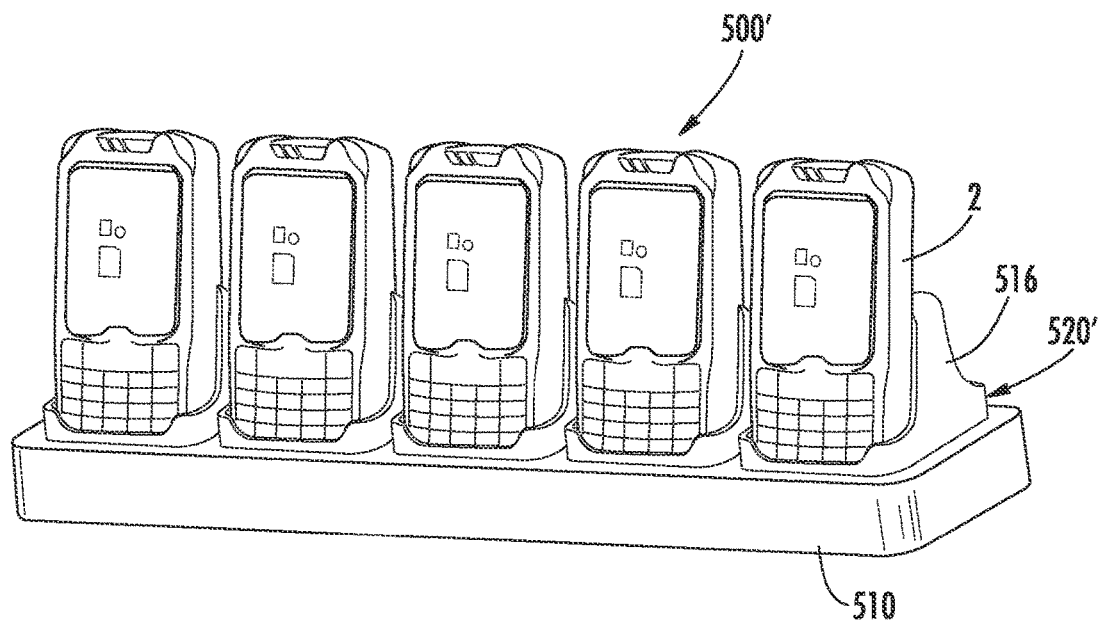
FIG. 20 shows a variation of the docking station module shown in FIG. 16.
Figure 21:
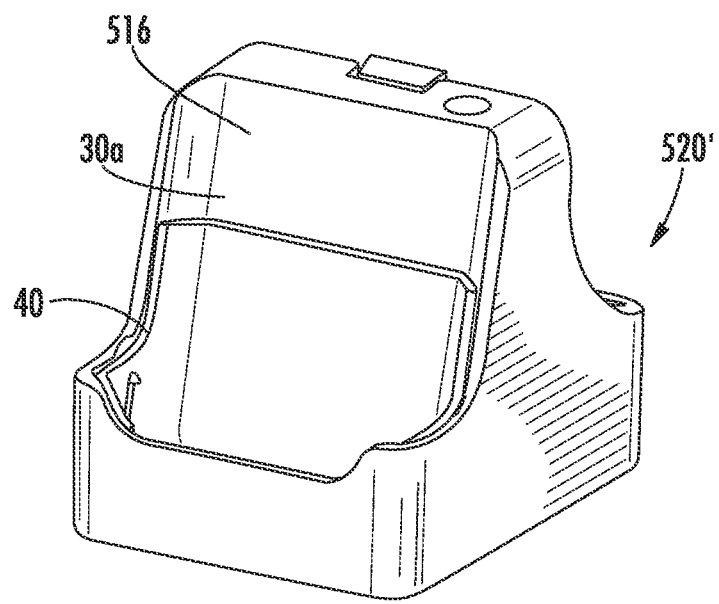
FIG. 21 shows a docking station of FIG. 20, wherein the docking station is fitted with a device adapter.

FIG. 20 shows a variation 500' of the above described docking station module 500. The docking station module 500' can have a single piece docking base 510, as is described in the above embodiment. As is best shown in FIG. 21, the device adapter 520' in the docking station module 500' can be formed with a support 516 to afford additional stability to the portable electronic device 2 during the operation of the docking station module 500. In one example, the support 516 of the device adapter 520' can comprise a rear wall defining the receiving chamber 30*a* in the device adapter 520'. In the example shown in FIG. 21, an adapter insert 40 can be employed to use with the device adapter 520'.

Figure 22A:
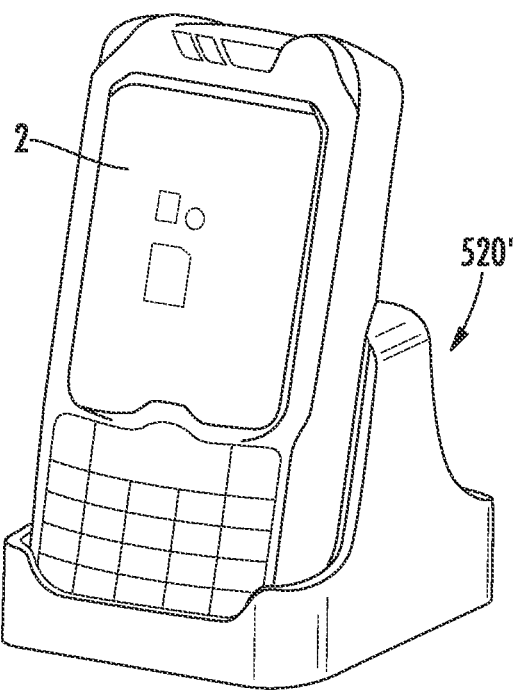
FIGS. 22A and 22B show that the docking station of FIG. 21 is used to receive a portable electronic device in the first and second working positions.
Figure 22B:
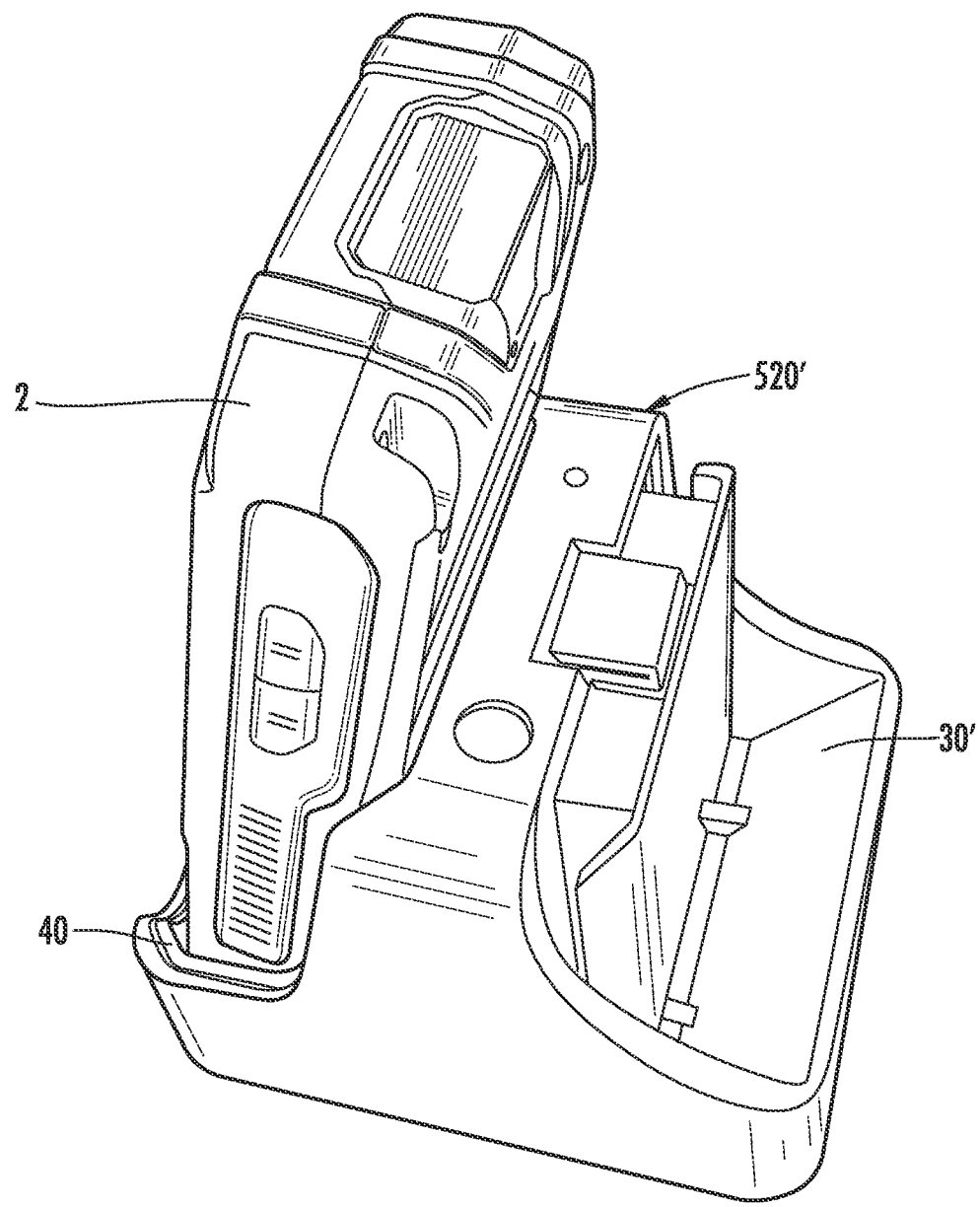

FIGS. 22A and 22B show an alternative embodiment, in which the device adapter 520' is used as a docking station in a stand-alone position, without the docking base 510. For example, the device adapter 520' can be adapted to receive a portable electronic device 2 during a battery charging and/or data transferring operation. In the example shown in FIG. 22A, the portable device 2 fitted with a cover case 4 is directly received in the receiving chamber 30*a* in the device adapter 520'. In the example shown in FIG. 22B, an adapter insert 40 is used together with the device adapter 520' to receive a portable electronic device 2 without its cover case 4. FIG. 22B also shows that the device adapter 520' can be formed with an additional receiving chamber 30' for receiving an additional device. For example, the additional receiving chamber 30' in the device adapter 520' can be configured to receive and charge a spare battery 2' for the portable electronic device 2 during the battery charging and/or data transferring operation.

When the device adapter 520' is used as a docking station in a stand-alone position, a power cable can be employed to electrically connect the device adapter 520' to a standard power source (e.g., standard AC outlet, an automobile 12V supply, or a low voltage 5V supply).

Figure 23:
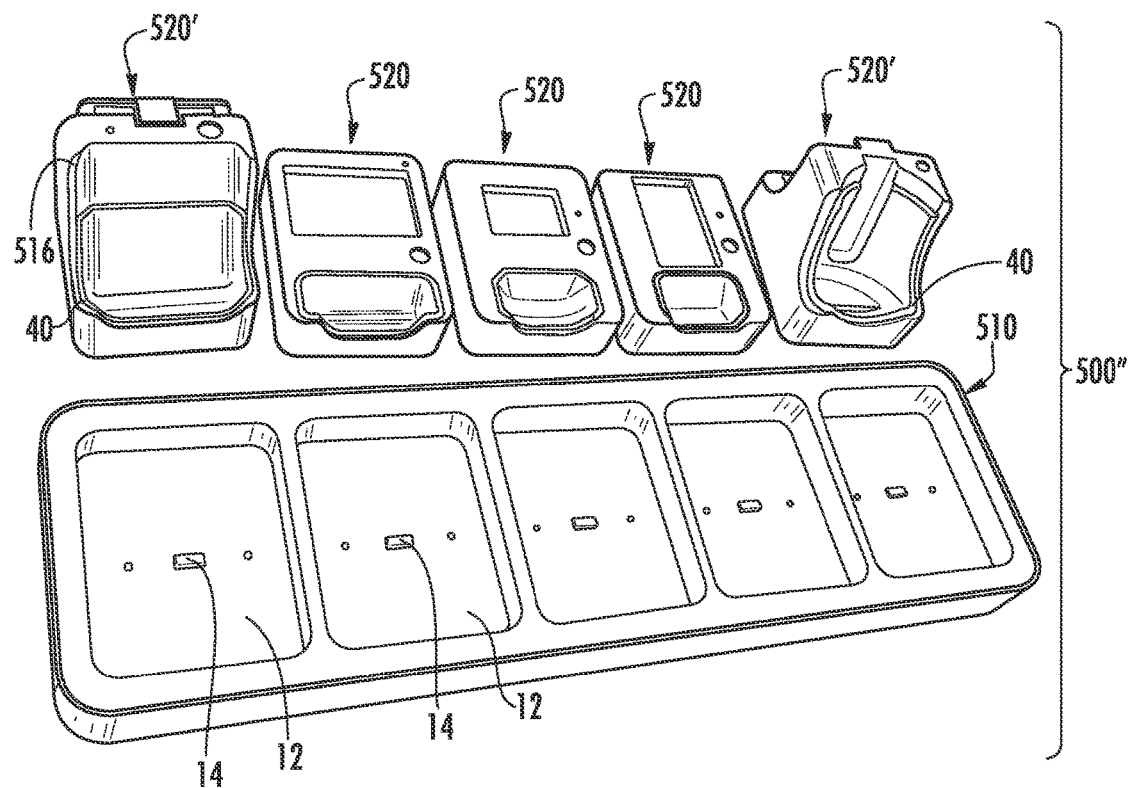
FIG. 23 is an exploded perspective view of another variation of the docking station module shown in FIG. 16.
Figure 24:
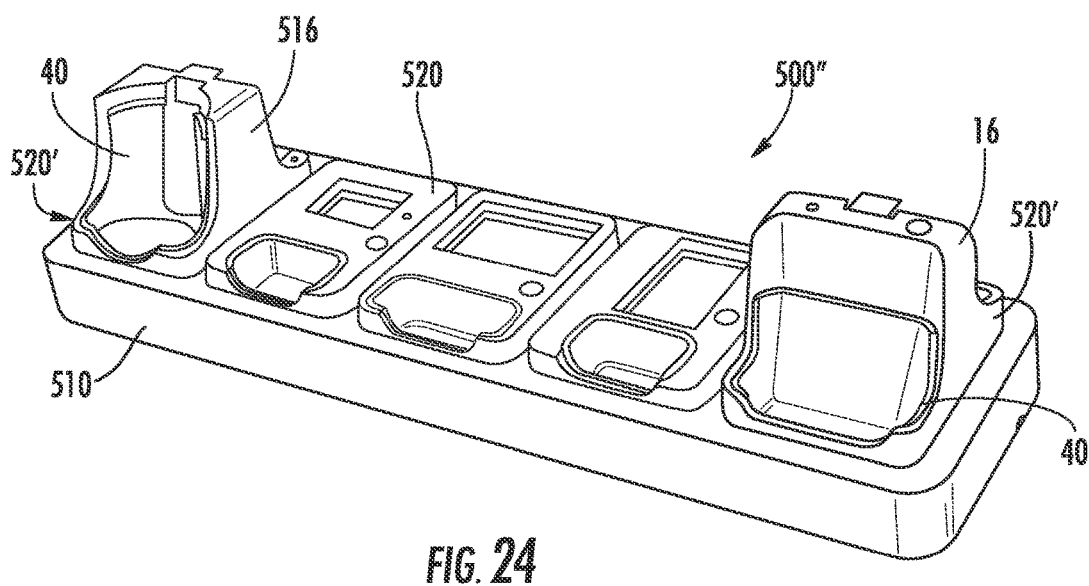
FIG. 24 is a perspective view of the docking station module of FIG. 23 after being assembled.

FIG. 23 is an exploded view of another variation 500" of the docking station module 500 shown in FIG. 16. In the docking station module 500", various device adapters 520, 520' are provided and formed as those described above to receive various types of portable electronic devices 2. One or more of these device adapters 520, 520' can be removably fitted in the receiving areas 12 in the single piece docking base 510, as is shown in FIG. 24.

Figure 25:
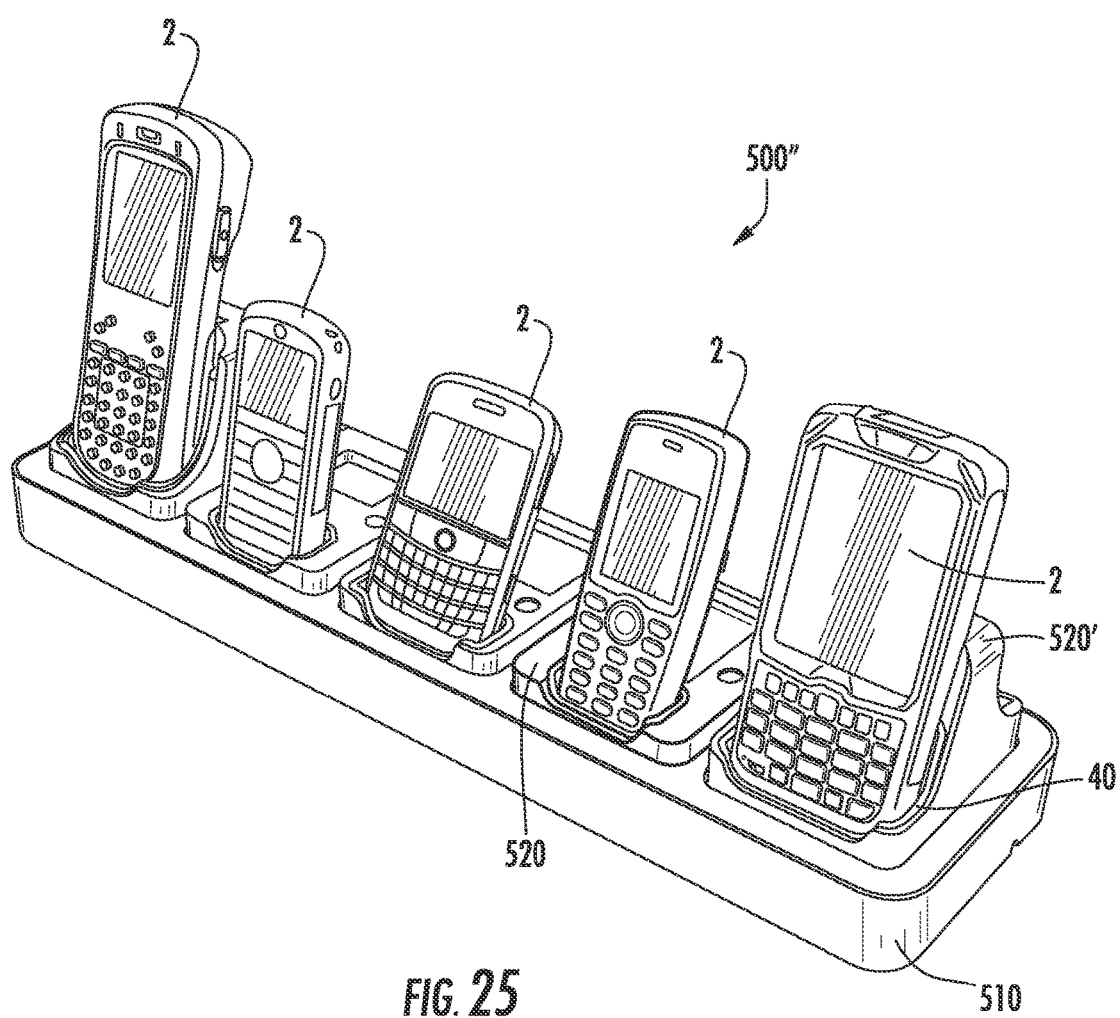
FIG. 25 shows the docking station module of FIG. 23 in an operation position for charging battery and/or transferring data to and from various portable electronic devices.

As FIG. 25 shows, the device adapters 520 in the docking station module 500" can be used to receive mobile phones (e.g., cell phones or smart phones). Additionally or alternatively, the device adapters 520' can be used to receive mobile computers or scanners. In one example, the support 516 in the device adapters 520' can provide additional support to such device of greater height and/or weight.

Figure 26A:
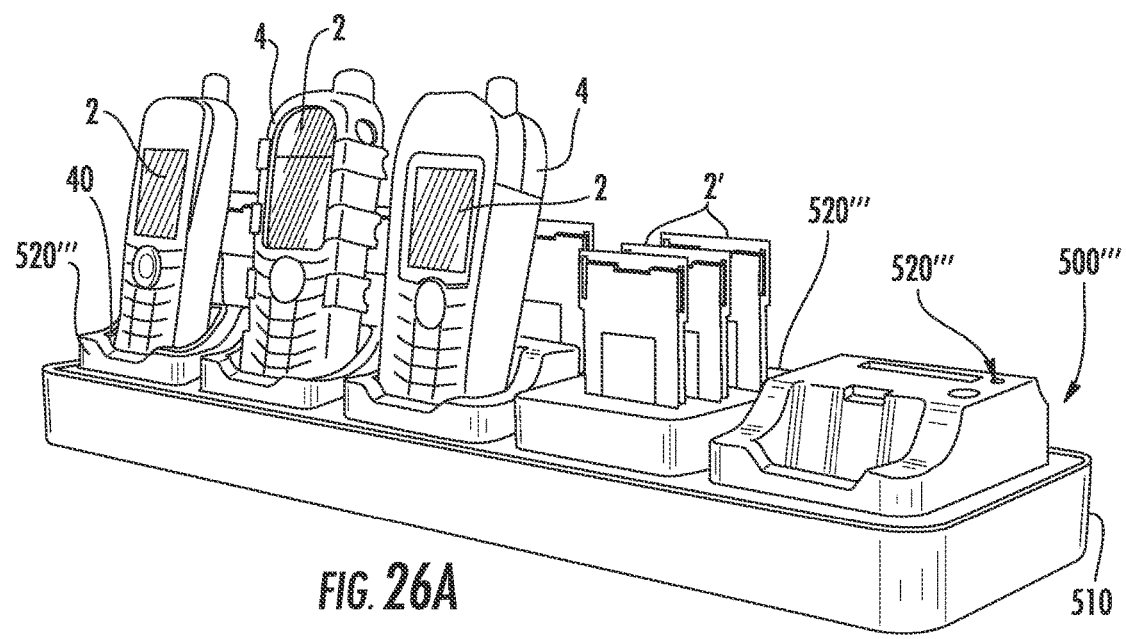
FIGS. 26A to 26E show respectively another variation of the docking station module in FIG. 16, a device adapter used in the docking station module, and the docking station used to receive a portable electronic device in stand alone working positions.
Figure 26B:
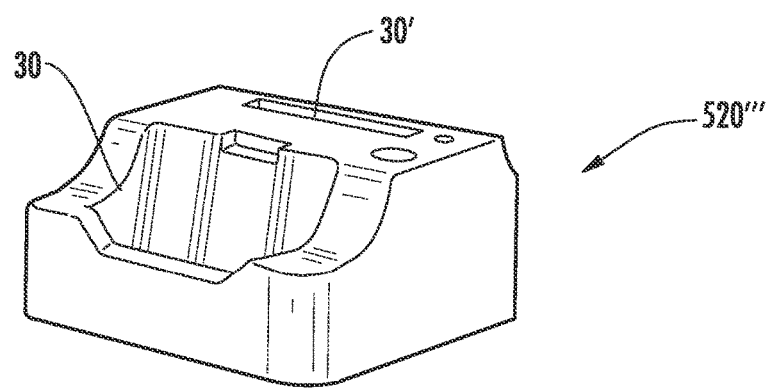

FIG. 26A shows another variation 500''' of the docking station module 500 of FIG. 16. In this embodiment, the docking base 510 of the docking station module 500''' can be formed to support multiple device adapters 520''', 520''''. In the example of FIG. 26B, the device adapter 520''' of the docking station module 500''' is shown to have at least one battery receiving chamber 30', in addition to the receiving area 30 described above in connection with the device adapter 520. Such battery receiving chamber 30' can be used to charge a rechargeable battery 2' during the battery charging and/or data transferring operation. In one example, the rechargeable battery 2' can be a spare battery for the portable electronic device 2.

Additional electrical components and circuits can also be employed in the device adapter 520'''. For example, one or more indicators can be formed on the device adapter 520''' to indicate the battery charging status of the portable electronic device 2 and/or the battery 2'. In another example, one or more indicators can be employed to indicate the power status of the device adapter 520'''.

Figure 26C:
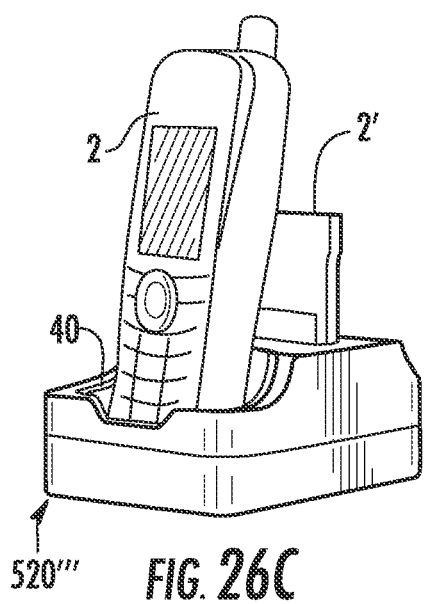
Figure 26D:
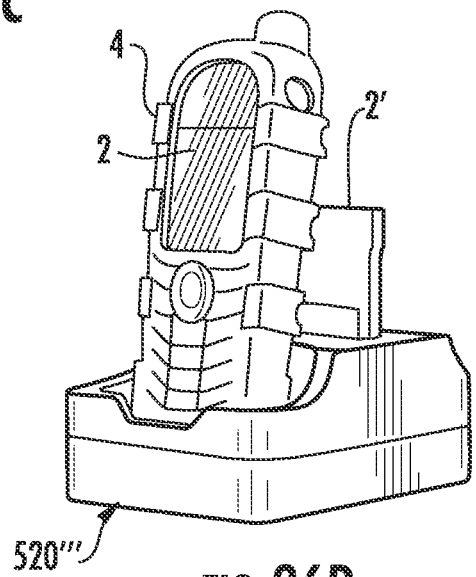
Figure 26E:
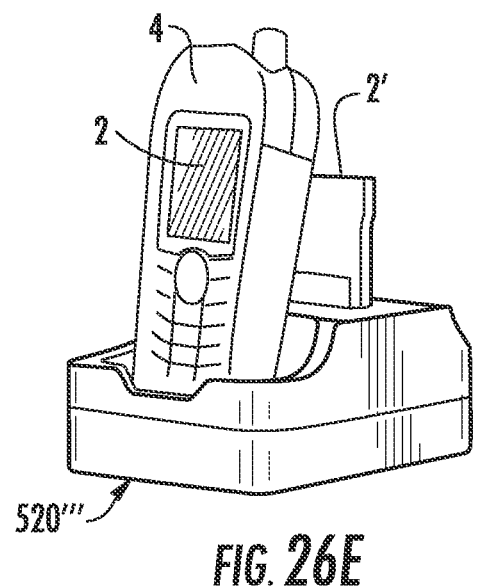

FIGS. 26C to 26E shows the device adapter 520''' being used to charge a portable electronic device 2 in a stand alone position, without the docking base 510. As is discussed above, a power cable can be used to connect the device adapter 520''' to a standard power source (e.g., standard AC outlet, an automobile 12V supply, or a low voltage 5V supply). Additionally or alternatively, the device adapter 520''' can be used to charge a battery 2' during the battery charging and/or data transferring operation of the portable electronic device 2.

In the example of FIG. 26C, the portable electronic device 2 is free of a protective cover case and directly received in the device adapter 520'''. In one example, an adapter insert 40 can be employed to assist in supporting the portable electronic device 2 during the battery charging and/or data transferring operation. In the examples shown in FIGS. 26D and 26E, the device adapter 520''' can be adapted to receive a portable electronic device 2 fitted with various cover cases 4.

As is shown in FIG. 26A, the device adapter 520'''' of the docking station module 500''' can be configured to have a plurality of battery receiving chamber 30'. For example, the additional battery receiving chamber 30' can be configured to receive and charge a spare battery 2' for the portable electronic device 2 during the battery charging and/or data transferring operation. In the example of FIG. 26A, the device adapter 520'''' of the docking station module 500''' is shown to have only battery receiving chambers 30'.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A docking station operable for charging a battery and transferring data to or from a portable electronic device, the docking station comprising:
   a docking base having an adapter receiving area and an adapter contact port formed in the adapter receiving area; and
   at least one device adapter configured to be removably fit in the adapter receiving area of the docking base, the device adapter comprising:
      a main adapter body having a base portion configured to be received and supported in the adapter receiving area on the docking base, the main adapter body having a device receiving area configured to receive and support at least a portion of the portable electronic device;
      a device contact port formed in the device receiving area for electrically contacting a contact port formed on the portable electronic device; and
      a docking contact port formed on the base portion for electrically contacting the adapter contact port on the docking base, the docking contact port being electrically connected to the device contact port in the device receiving area;
   wherein the docking contact port is configured to electrically contact the adapter contact port on the docking base to charge the portable electronic device and to transfer data to and from the portable electronic device, when the device adapter is fit in the docking base;
   wherein the device adapter is configured to operate in a stand-alone mode where the device adapter electrically connects to an external power source to charge the portable electronic device, when the device adapter is removed and separated from the docking base.

2. The docking station of claim 1, wherein the adapter receiving area in the docking base is configured to receive and support a portion of the portable electronic device.

3. The docking station of claim 1, wherein the adapter receiving area is formed as an adapter receiving chamber surrounded by a tapered surrounding wall, the surrounding wall having a top edge at least partially formed to conform to the shape of the portion of the portable electronic device.

4. The docking station of claim 1, wherein the device adapter comprises a skirt portion joined with the main adapter body, the skirt portion having a bottom edge configured to support the device adapter in the adapter receiving area on the docking base.

5. The docking station of claim 1, wherein the adapter contact port, the device contact port, and the docking contact port are a USB type port.

6. The docking station of claim 1, further comprising an adapter insert,
wherein the adapter insert has an exterior portion configured to be received and supported in the device receiving area on the main adapter body; and
wherein the adapter insert has an interior portion configured to receive and support the portable electronic device.

7. The docking station of claim 1,
wherein the adapter receiving area of the docking base is configured to directly receive the portable electronic device free of a cover case; and
wherein the device receiving portion of the device adapter is configured to receive the portable electronic device fitted with a cover case.

8. The docking station of claim 1, wherein the docking base comprises a plurality of adapter receiving areas each being formed with an adapter contact port.

9. The docking station of claim 8,
wherein the at least one device adapter comprises a plurality of device adapters configured to be received and supported in the plurality of adapter receiving areas of the docking base; and
wherein at least two of the plurality of device adapters are configured to have different device receiving areas for receiving different portable electronic devices.

10. The docking station of claim 8, wherein the at least one device adapter comprises a plurality of device adapters, the base portions of the plurality of device adapters being the same;
whereby the plurality of device adapters can be interchangeably received and supported in the plurality of adapter receiving areas of the docking base.

11. A docking station operable for charging a battery and transferring data to or from a portable electronic device, the docking station comprising:
a docking base having an adapter receiving area and an adapter contact port formed in the adapter receiving area; and
at least one device adapter configured to be removably fit in the adapter receiving area of the docking base, the device adapter comprising:
a main adapter body having a base portion configured to be received and supported in a docking station, the main adapter body having a device receiving area, which is larger than the base portion of the main adapter body and is configured to receive and support at least a portion of a portable electronic device;
a device contact port formed in the device receiving area for electrically contacting a contact port formed on the portable electronic device;
a docking contact port formed on the base portion for electrically contacting a contact port on the docking station; and
wherein the docking contact port on the base portion is electrically connected to the device contact port in the device receiving area and configured to charge the portable electronic device and to transfer data to and from the portable electronic device, and
wherein the device receiving area of the main adapter body is larger than the adapter receiving area in the docking base,
wherein the device adapter is configured for at least one of:
use in a stand-alone position and
to connect to a standard power source,
whereby, during a normal use of the device adapter, the device receiving area is capable of receiving and supporting at least a portion of a portable electronic device that has a larger size than the base portion of the main adapter body.

12. The device adapter of claim 11, wherein the device contact port and the docking contact port are a USB type port.

13. The device adapter of claim 11, wherein the main adapter body has an additional device receiving area configured to receive and support an additional electronic device.

14. The device adapter of claim 11, further comprising an adapter insert,
wherein the adapter insert has an exterior portion configured to be received and supported in the device receiving area on the main adapter body; and
wherein the adapter insert has an interior portion configured to receive and support the portable electronic device.

15. The device adapter of claim 11, further comprising an external contact port configured to charge the portable electronic device and to transfer data to and from the portable electronic device.

16. The docking station of claim 1, wherein an external contact port is configured to charge the portable electronic device and to transfer data to and from the portable electronic device.

17. The device adapter of claim 11, wherein the device receiving area of the main adapter body is elevated from the base portion of the main adapter body.

18. The docking station of claim 1, wherein the device adapter is configured to support the electronic device in a substantially upright position in the stand-alone mode.

* * * * *